United States Patent
Burgoyne et al.

(10) Patent No.: US 12,198,356 B2
(45) Date of Patent: *Jan. 14, 2025

(54) OPTIMIZED MATCHED FILTER TRACKING OF SPACE OBJECTS

(71) Applicant: Trans Astronautica Corporation, Lake View Terrace, CA (US)

(72) Inventors: Hayden Burgoyne, Glendale, CA (US); Robert Jedicke, Kaneohe, HI (US); Joel C. Sercel, Lake View Terrace, CA (US); Juliana Richter, Los Angeles, CA (US); Peter Stephen Gural, Lovettsville, VA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,160

(22) Filed: Jun. 6, 2023

(65) Prior Publication Data

US 2024/0169558 A1 May 23, 2024

Related U.S. Application Data

(63) Continuation of application No. 17/963,127, filed on Oct. 10, 2022, now Pat. No. 11,748,897.

(Continued)

(51) Int. Cl.
 *G06T 7/246* (2017.01)
 *G06T 7/73* (2017.01)
 *G06V 20/13* (2022.01)

(52) U.S. Cl.
 CPC .......... *G06T 7/246* (2017.01); *G06T 7/73* (2017.01); *G06V 20/13* (2022.01); *G06T 2207/10032* (2013.01); *G06T 2207/10144* (2013.01)

(58) Field of Classification Search
 CPC .......... G06T 2207/10032; G06T 2207/10144; G06T 7/246; G06T 7/73; G06V 20/13
 See application file for complete search history.

(56) References Cited

U.S. PATENT DOCUMENTS

| 2,930,187 A | 3/1960 | Chillson |
| 2,975,592 A | 3/1961 | Fox |

(Continued)

FOREIGN PATENT DOCUMENTS

| AU | 2007200666 A1 | 8/2007 |
| CN | 103075816 | 5/2013 |

(Continued)

OTHER PUBLICATIONS

Yao et al., Jan. 2012, Faint moving object detection in portal astronomical image using a 2D-1D IUWT, Intelligent Science and Intelligent Data Engineering, 7202:442-449.

(Continued)

*Primary Examiner* — Ian L Lemieux
(74) *Attorney, Agent, or Firm* — Knobbe, Martens, Olson & Bear, LLP

(57) ABSTRACT

Systems and techniques for the optimized matched filter tracking of space objects are provided. In one aspect, a method of detecting faint objects includes receiving a plurality of telescope images from a telescope imaging system and performing a plurality of computational calculations on the telescope images using a plurality of search parameters to identify one or more objects moving through the telescope images. The number of the computational calculations is reduced by a priori relatively restricting a parameter space of the computational calculations.

20 Claims, 15 Drawing Sheets

Related U.S. Application Data

(60) Provisional application No. 63/367,031, filed on Jun. 24, 2022.

(56) References Cited

U.S. PATENT DOCUMENTS

| | | | |
|---|---|---|---|
| 2,991,617 | A | 7/1961 | Nerad |
| 3,063,521 | A | 11/1962 | Fuller |
| 3,064,418 | A | 11/1962 | Sanders |
| 3,564,253 | A | 2/1971 | Buckingham |
| 3,597,923 | A | 8/1971 | Simon |
| 3,606,211 | A | 9/1971 | Roersch et al. |
| 4,013,885 | A | 3/1977 | Blitz |
| 4,135,489 | A | 1/1979 | Jarvinen |
| 4,286,581 | A | 1/1981 | Atkinson, Jr. |
| 4,263,895 | A | 4/1981 | Colao |
| 4,449,514 | A | 5/1984 | Selcuk |
| 4,459,972 | A | 7/1984 | Moore |
| 4,480,677 | A | 11/1984 | Henson et al. |
| 4,528,978 | A | 7/1985 | Robinson |
| 4,564,275 | A | 1/1986 | Stone |
| 4,781,018 | A | 11/1988 | Shoji |
| 4,815,443 | A | 3/1989 | Vrolyk |
| 5,014,131 | A | 5/1991 | Reed et al. |
| 5,047,654 | A | 9/1991 | Newman |
| 5,104,211 | A | 5/1992 | Schumacher et al. |
| 5,138,832 | A | 8/1992 | Pande |
| 5,202,541 | A | 4/1993 | Patterson |
| 5,266,762 | A | 11/1993 | Hoffman |
| 5,305,970 | A | 4/1994 | Porter et al. |
| 5,459,996 | A | 10/1995 | Malloy, III |
| 5,511,748 | A | 4/1996 | Scott |
| 5,593,549 | A | 1/1997 | Stirbl et al. |
| 5,674,794 | A | 10/1997 | Chatterjee |
| 5,751,895 | A | 5/1998 | Bridges |
| 5,861,947 | A | 1/1999 | Neumann |
| 5,982,481 | A | 11/1999 | Stone |
| 6,057,505 | A | 5/2000 | Ortabasi |
| 6,193,193 | B1 | 2/2001 | Sorrano |
| 6,343,464 | B1 | 2/2002 | Westerman |
| 6,350,973 | B2 | 2/2002 | Wroe |
| 6,532,953 | B1 | 3/2003 | Blackmon et al. |
| 6,669,148 | B2 | 12/2003 | Anderman et al. |
| 6,742,325 | B2 | 6/2004 | Kudija, Jr. |
| 7,207,327 | B2 | 4/2007 | Litwin |
| 7,387,279 | B2 | 6/2008 | Anderman et al. |
| 7,575,200 | B2 | 8/2009 | Behrens et al. |
| 7,594,530 | B1 | 9/2009 | Tucker |
| 7,823,837 | B2 | 11/2010 | Behrens et al. |
| 8,033,110 | B2 | 10/2011 | Gilon et al. |
| 8,357,884 | B1 | 1/2013 | Ethridge |
| 8,379,310 | B2 | 2/2013 | Mori et al. |
| 9,010,317 | B1 | 4/2015 | Gross |
| 9,187,191 | B1 | 11/2015 | Jensen et al. |
| 9,222,702 | B2 | 12/2015 | Goldberg |
| 9,266,627 | B1 | 2/2016 | Anderson |
| 9,409,658 | B1 | 8/2016 | Diamandis et al. |
| 9,581,021 | B2 | 2/2017 | Ethridge |
| 9,676,499 | B2 | 6/2017 | Myers et al. |
| 9,709,771 | B2 | 7/2017 | Corrigan |
| 10,032,285 | B1 | 7/2018 | Ma |
| 10,445,862 | B1 | 10/2019 | Merry et al. |
| 10,654,596 | B1 | 5/2020 | Eller |
| 10,919,227 | B2 | 2/2021 | Cook |
| 10,989,443 | B1 | 4/2021 | Sercel et al. |
| 11,085,669 | B2 | 8/2021 | Sercel |
| 11,143,026 | B2 | 10/2021 | Sercel et al. |
| 11,188,750 | B1 | 11/2021 | Ma et al. |
| 11,280,194 | B2 | 3/2022 | Sercel |
| 11,391,246 | B2 | 7/2022 | Sercel et al. |
| 2002/0075579 | A1 | 6/2002 | Vasylyev et al. |
| 2002/0184873 | A1 | 12/2002 | Dujarric |
| 2003/0029969 | A1 | 2/2003 | Turner |
| 2003/0224082 | A1 | 12/2003 | Akopyan |
| 2004/0004184 | A1 | 1/2004 | Schubert |
| 2004/0231716 | A1 | 11/2004 | Litwin |
| 2006/0233421 | A1 | 10/2006 | Portigal et al. |
| 2007/0128582 | A1 | 6/2007 | Anderson et al. |
| 2008/0023060 | A1 | 1/2008 | Grumazescu |
| 2008/0156315 | A1 | 7/2008 | Yangpichit |
| 2010/0038491 | A1 | 2/2010 | Cepollina et al. |
| 2010/0163683 | A1 | 7/2010 | Quine |
| 2010/0252024 | A1 | 10/2010 | Convery |
| 2010/0269817 | A1 | 10/2010 | Kelly |
| 2010/0294261 | A1 | 11/2010 | Deforge |
| 2010/0319678 | A1 | 12/2010 | Maemura et al. |
| 2011/0031238 | A1 | 2/2011 | Segawa |
| 2011/0041894 | A1 | 2/2011 | Liao |
| 2011/0127382 | A1 | 6/2011 | Im |
| 2011/0220091 | A1 | 9/2011 | Kroyzer |
| 2011/0315678 | A1 | 12/2011 | Furuya |
| 2012/0155966 | A1 | 6/2012 | Zillmer |
| 2013/0021471 | A1 | 1/2013 | Waterhouse |
| 2013/0206209 | A1 | 8/2013 | Lasich |
| 2013/0239952 | A1 | 9/2013 | Kroyzer |
| 2014/0138952 | A1 | 5/2014 | Marumoto |
| 2014/0150651 | A1 | 6/2014 | Velasco Valcke |
| 2014/0174430 | A1 | 6/2014 | Fitzgerald et al. |
| 2014/0262278 | A1 | 9/2014 | Walton |
| 2014/0318127 | A1 | 10/2014 | Kerns |
| 2015/0027102 | A1 | 1/2015 | Bahn et al. |
| 2015/0180114 | A1 | 6/2015 | Achour |
| 2015/0192411 | A1 | 7/2015 | Hutchin |
| 2016/0010442 | A1 | 1/2016 | Kearl |
| 2016/0024921 | A1 | 1/2016 | Ethridge |
| 2016/0076792 | A1 | 3/2016 | Magaldi |
| 2016/0121395 | A1 | 5/2016 | Kawanaka |
| 2016/0300341 | A1 | 10/2016 | Hay et al. |
| 2017/0039446 | A1 | 2/2017 | Silny et al. |
| 2017/0129579 | A1 | 5/2017 | De Jong |
| 2017/0358103 | A1 | 12/2017 | Shao et al. |
| 2018/0194626 | A1 | 7/2018 | Berggren et al. |
| 2018/0265224 | A1 | 9/2018 | Foulds et al. |
| 2019/0271228 | A1 | 9/2019 | Sowers, Jr. et al. |
| 2021/0061494 | A1 | 3/2021 | Belieres Montero |
| 2021/0150253 | A1 | 5/2021 | Akagunduz et al. |
| 2021/0333019 | A1 | 10/2021 | Sercel et al. |
| 2022/0046612 | A1 | 1/2022 | Sercel et al. |
| 2022/0082019 | A1 | 3/2022 | Sercel et al. |
| 2022/0089302 | A1 | 3/2022 | Sercel et al. |
| 2022/0090500 | A1 | 3/2022 | Sercel |
| 2022/0268524 | A1 | 8/2022 | Small |
| 2022/0275721 | A1 | 9/2022 | Sercel |
| 2022/0290635 | A1 | 9/2022 | Sercel |
| 2024/0185438 | A1* | 6/2024 | Montanaro ............ G06T 7/248 |

FOREIGN PATENT DOCUMENTS

| | | |
|---|---|---|
| CN | 109102522 | 12/2018 |
| EP | 2 177 846 | 4/2010 |
| EP | 2 195 583 | 3/2013 |
| ES | 2639583 | 10/2017 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |
| WO | WO 20/033561 | 2/2020 |

OTHER PUBLICATIONS

International search report and written opinion dated Jan. 2, 2024 in application No. PCT/US2023/068810.

Alternative Scenarios Utilizing Nonterrestrial Resources Charles H. Eldred and Barney B. Roberts, Space Resources Scenarios NASA 1992.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

(56) References Cited

OTHER PUBLICATIONS

Bliss, T., et al. "Experimental validation of robust resonance entrainment for cpg-controlled tensegrity structures." IEEE Transactions on Control Systems Technology, 2012, vol. 21(3), pp. 666-678.
Bottke, W.F., et al., Debiased orbital and Absolute Magnitude Distribution of the near-Earth objects, Icarus 156, 399-433, 2002.
Bowersox, Kenneth and NASA Advisory Council Committee on Human Exploration and Operations, "NASA Advisory Council Finding on NASA Human Exploration Strategy," from the Council Public Deliberation, Jul. 31, 2014.
Boyle, A., "Blue Origin Space venture slips in a sneak peek at design of Blue Moon lunar lander", Apr. 5, 2017, https://www.geekwire.com/2017/blue-origin-sneak-peek-blue-moon-lunar-lander/.
Boyle, A., "Jeff Bezos lays out his vision for city on the moon, complete with robots", May 20, 2017,https://www.geekwire.com/2017/jeff-bezos-blue-origin-moon/.
Brophy, J., et al, "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.
Brown, P., et al., The Flux of small near-Earth objects colliding with the Earth, Nature 420, 294-296, 2002.
Bussey, D. B. J., et al., "Permanent shadow in simple craters near the lunar poles," Geophysical Research Letters, 2003, vol. 30, No. 6, 1278, pp. 11-1-11-4.
Cassapakis, C.G., et al., "A Power Antenna for Deep Space Missions," Solar Engineering Editors: J.H. Davidson and J. Chavez. Book No. HO1046, 1996.
Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI:10.5545/sv-jme.2014.2063; in 11 pages.
Chen, L.H., et al., Soft spherical tensegrity robot design using rod-centered actuation and control, Journal of Mechanisms and Robotics, 2017, vol. 9(2) pp. 025001.
Chen, M., et al., "Energy analysis of growth adaptable artificial gravity space habitat," AIAA Space and Astronautics Forum and Exposition, 2018, in 13 pages.
Cohen, Marc M., et al, "Asteroid Mining," AIAA 2013-5304, presented at AIAA Space 2013 Conference and Exposition, Sep. 10-12, 2013, San Diego, CA.
Colaprete, A., et al., "Detection of water in the Icross ejecta plume," Science, vol. 330, pp. 463-468, Oct. 22, 2010.
Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.
Craft, J., et al. "Percussive digging systems for planetary research" IEEE Aerospace and Electronic Systems Magazine, 2010, vol. 25 pp. 21-26.
Crawford, I.A., Lunar resources: A review. Progress in Physical Geography, 39(2):137-167, 2015.
Crusan, J., "an Evolvable Mars Campaign" NASA Presentation, Jul. 2014, available at https://www.nasa.gov/sites/default/files/files/20140429-Crusan-Evolvable-Mars-Campaign.pdf.
David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.
Duke, M., et al., "Mining of lunar polar ice", 36th AIAA Aerospace Sciences Meeting and Exhibit, 1998, pp. 1069.
Ehricke, K.A., "The Solar-Powered Space Ship," ARS Paper 310-56, Jun. 1956.
Eldred, et al., "Alternative Scenarios Utilizing Nonterrestrial Resources", Space Resources Scenarios NASA, 1992.
Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.
Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.
Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.
FAA 2012 Commercial Space Transportation Forecasts. Available at http://www.faa.gov/about/office_org/headquarters_offices/ast/media/The_Annual_Compendium_of_Commercial_Space_Transporation_2012.pdf.
Fabbrocino, F., et al., "Optimal prestress design of composite cable-stayed bridges". Composite Structures, 2017, vol. 169, pp. 167-172.
Feldman, W. C., et al., (1998). "Fluxes of fast and epithermal neutrons from Lunar Prospector", Evidence for water ice at the lunar poles, science 281, 1998, pp. 1496-1500.
Fincannon, J., "Lunar Polar Illumination for Power Analysis", NASA/TM, 2008-215446, https://ntrs.nasa.gov/archive/nasa/casi.ntrs.nasa.gov/20080045536.pdf.
Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.
Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.
Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.
Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.
Garenne, A.B., et al, "The Abundance and Stability of Water in Type 1 and 2 Carbonaceous Chondrites," CI, CM, and CRI Geochimica et Cosmochimica Acta 137, 93-112, 2014.
Gertsch, L.S., et al., Laboratory Demonstration and Test of Solar Thermal Asteroid ISRU, funded NASA Early Stage Innovations Space Tech Research Grants, Proposed 2014, funded Jan. 2015.
Gertsch, R.E., et al, "Near Earth Resources," In Near Earth Objects, Annals of the New York Academy of Science, vol. 822, p. 468-510, 1997.
Gertsch, R.E., et al., "Mining near Earth resources," In Near Earth Objects, Annals of the New York Academy of Sciences, vol. 822, p. 511-537, 1997.
Gläser, P., et al., "Illumination conditions at the lunar poles: Implications for future exploration". Planetary and Space Science, in press, 2017, https://doi.org/10.1016/j.pss. 2017.07.006.
Goyal, R., et al., "Analytical study of tensegrity lattices for mass-efficient mechanical energy absorption", International Journal of Space Structures, 2018.
Goyal, R., et al., "Modeling of tensegrity structures", Journal of Open Source Software, 2019, vol. 4(42), pp. 1613.
Goyal, R., et al., "Tensegrity system dynamics with rigid bars and massive strings", Multibody System Dynamics, 2019, vol. 46(3) pp. 203-228.
Granvik et al., Abstract, IAU-Symposium: Complex Planetary Systems, Jul. 7-11, 2014, Namur, Belgium.
Granvik, M., et al., "The population of natural Earth satellites," Icarus, 2012.
Griffin, M.D., et al., "Space Vehicle Design, Second Edition (AIAA Education)", pp. 29-37, Feb. 23, 2004.
GRIP; Modeling and Simulation of Asteroid Capture Using a Deformable Membrane Capture Device; Proceedings of the ASME 2015 International Design Engineering Technical Conferences &

(56) References Cited

OTHER PUBLICATIONS

Computers and Information in Engineering Conference; IDETC/CIE 2015; Aug. 2-5, 2015; Boston, USA; In 10 pages.
Grossman, G., et al, "Inflatable Concentrators for Solar Propulsion and Dynamic Space Power." Journal of Solar Energy Engineering, Nov. 1990, vol. 112/229.
Gural et al., Jul. 2018, Moving Object Detection using a Parallax Shift Vector Algorithm, Publ Astron Soc Pac, 130(989):074504, 30 pp.
Gural et al., Nov. 2003, Matched Filter Processing for Asteroid Detection in Cluttered Star Fields, Proceedings of the Core Technologies for Space Systems Conf., 17 pp.
Gural et al., Oct. 2003, Asteroid Search with Advanced Detection Algorithmsto Existing Asteroid Search Programs, NASA Center for AeroSpace Information (CASI) report ID# 20040021361, 18 pp.
Gural et al., Oct. 2005, Matched Filter Processing for Asteroid Detection, Astronomical Journal, 130:1951-1960.
Gural, 2016, Final Report and Recommendations for Asteroid Search Algorithms when Applied to the Low Earth Orbiting Asteroid Surveillance Satellite NEOSSat, Leidos contractual final report submitted to NASA HQ via Planetary Sciences Institute, 51 pp.
Harwood, William, "NASA's proposed asteroid retrieval mission outlined." Posted in Space Flight Now: Apr. 6, 2013. Available at https://spaceflightnow.com/news/n1304/06asteroid/.
Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.
Hayne, P. O., et al., "Diviner Lunar Radiometer Observations of the LCROSS Impact", Science 330, 2010, pp. 477.
Heiken, G.H., et al., "Lunar sourcebook—a user's guide to the moon". NASA,. Cambridge, England, Cambridge University Press, 1991, vol. 753, pp.
Interbartolo III. Michael A, et al, "Prototype Development of an Integrated Mars Atmosphere and Soil-Processing System", Journal of Aerospace Engineering, Jan. 2013, vol. 26(1), pp. 57-66.
Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.
Lawrence, D. J., et al., "Evidence for water ice near Mercury's north pole from messenger Neutron Spectrometer measurements". Science 339, 2013, pp. 292-296.
Lewis, J.A., "Logistical Implications of Water Extraction from Near-Earth Asteroids," Proceedings of the Eleventh SSI—Princeton Conference, May 12-15, 1993.
Lewis, J.A., "Hard Choices for Manned Spaceflight: America as Icarus", http://csis.org/files/publication/140508_Lewis_HardChoicesMannedSpace_flight_Web.pdf, 2014.
Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).
Li, S. et al., "Possible detection of surface water ice in the lunar polar regions using data from the Moon Mineralogy Mapper (M3)," presented at LPSC XLVIII, Mar. 2017, Houston, TX.
Lunar Exploration Advisory Group "Commercial Lunar Propellant Architecture a Collaborative Study of Lunar Propellant Production", Final Report. Aug. 2018.
Masten, Jun. 17, 2021, Break the ice: Masten designs rocket mining system to extract lunar water, blog, 8 pp.
Mazanek et al., "Asteroid Retrieval Mission Concept—Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.
Mazarico, E., et al., "Illumination Conditions of the Lunar Polar Regions Using LOLA Topography." Icarus, vol. 211, No. 2, 2011, pp. 1066-1081., doi:10.1016/j.icarus. 2010.10.030.

Mohanty, Sep. 1981, Computer Tracking of Moving Point Targets in Space, IEEE Trans. Pattern Anal. Machine Intell., 3(5):606-611.
Mommert, M., et al, "Constraining the Physical Properties of Near-Earth Object 2009 BD," The Astrophysical Journal, vol. 786, No. 2.
Nagase, K., et al., "Minimal mass tensegrity structures", The International Association for Shell and Spatial Structures, 2014, vol. 55(1), pp. 37-48.
NASA Report from Office of the Chief Technologist, Emerging Space: The Evolving Landscape of 21st Century American Spaceflight, http://images.spaceref.com/docs/ 2014/Emerging_Space_Report.pdf.
NASA, "Asteroid Redirect Mission Reference Concept," 2013.
Norton, B., "Harnessing Solar Heat," Springer, pp. C1-xiii, 39 and 48-73, ISBN 978-007-7275-5, 2013.
Pike R.J., "Crater dimensions from Apollo data and supplemental sources". The Moon, 1976, vol. 15, pp. 463-477.
Pike, R.J., "Depth/diameter relations of fresh lunar craters: Revision from spacecraft data", Geophysical Research Letters, 1974, vol. 1(7), pp. 291-294.
Pohlig, Jan. 16, 1992, Maximum Likelihood Detection of Electro-optic Moving Targets, MIT Technical Report 940, Lexington, MA, 58 pp.
Rapp, D., "Use of Extraterrestrial Resources for Human Space Missions to Moon or Mars (Springer Praxis Books / Astronautical Engineering)" published Nov. 20, 2012.
Reed et al., Jul. 1988, Optical moving target detection with 3-D matched filtering, IEEE Trans. Aerosp. Electron. Syst., 24(4):327-336.
Reinhold; A Solar Powered Station at a Lunar Pole; Feb. 18, 2021; https://theworld.com/~reinhold/lunarpolar.html; 7 pages.
Rimoli, J.J., et al., "Mechanical response of 3-dimensional tensegrity lattices", Composites Part B: Engineering, 2017, vol. 115, pp. 30-42.
Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.
Rostami, J., et al., "Lunar tunnel boring machines", In Earth and Space 2018: Engineering for Extreme Environments, American Society of Civil Engineers, pp. 240-252, 2018, Reston, VA.
Sabelhaus, A.P., et al. "Model-predictive control of a flexible spine robot", American Control Conference, 2017, IEEE, pp. 5051-5057.
Sanders, Oct. 10, 2019, NASA Lunar ISRU Strategy, presented at the What Next for Space Resource Utilization? Workshop, Luxembourg, 20 pp.
Sanders-Reed, 1998, Maximum likelihood detection of unresolved moving targets, IEEE Trans. Aerosp. Electron. Syst., 34(3):844-859.
Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" For Excavation of Asteroids and Production of Mission Consumables." NASA SBIR. Apr. 7, 23015 (Apr. 23, 2015), pp. 1-2, [online] <URL: http://sbir.nasa.gov/SBIR/abstracts/15/sbir/phase1/SBIR-15-1-H1 .01-9278.html>.
Sercel, Apr. 22, 2015, Worker Bees: thin-film solar thermal technology enables water-based cis-lunar transportation architecture, ICS Associates Inc., 109 pp.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel; Time Dependent Finite Difference Modeling of Outgassing of Asteroids via Bulk Heating; 978-1-5386-2014-4/18/$31.00 © 2018 IEEE; | 14 pages.
Shao, M.B., et al., "Finding very Small Near-Earth Asteroids using Synthetic Tracking," Astrophysics .J 782:1, 2014, arXiv, 1309.3248.

(56) References Cited

OTHER PUBLICATIONS

Shapiro, I and the Committee to Review Near-Earth Object Surveys and Hazard Mitigation Strategies. Final Report, National Research Council, National Academies Press, 2010.

Shoji, J. M., et al., "Solar Thermal Propulsion Status and Future", AIAA-92-1719, AIAA Space Programs and Technologies Conference, Mar. 1992.

Skelton, R.E., Tensegrity Systems, 2009, Springer US.

Sowers et al., 2019, Ice mining in lunar permanently shadowed regions, New Space, 7(4):235-244.

Sowers, Jun. 12, 2018, Closing the Business Case for Lunar Propellant, PowerPoint presentation, 13 pp.

Spudis, P., et al., "Evidence for water ice on the moon: Results for anomalous polar craters from the Iro mini-rf imaging radar", Journal of Geophysical Research: Planets, 2013, vol. 118(10), pp. 2016-2029.

Squyres, S. and The NASA Advisory Council, Recommendation Regarding Mismatch Between NASA's Aspirations for Human Space Flight and Its Budget, from the Council Public Deliberation, Jul. 31, 2014.

Staugaitis, C., et al., "Mechanical and Physical Properties of the Echo II Metal-Polymer Laminate (NASA TND-3409)," NASA Goddard Space Flight Center, 1966.

Stoica, A. et al., "TransFormers of Extreme Environments and Their Integration in a Solar Power Infrastructure". AIAA Space 2016, AIAA Space Forum, 2016.

Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.

Sultan, C., et al., "Deployment of tensegrity structures", International Journal of Solids and Structures, 2003, vol. 40(18), pp. 4637-4657.

Sunspiral, V., et al, "Tensegrity based probes for planetary exploration: Entry, descent and landing (edl) and surface mobility analysis", International Journal of Planetary Probes, 2013, vol. 7, pp. 13.

Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.

Thomas, M. et al., "Scaling Characteristics of Inflatable Paraboloid Concentrators", Presented at the Second ASME-JSES-JSME International Solar Energy Conference, Reno, Nevada, Mar. 17-22, 1991.

Tukkaraja, P., et al. Lunar mining and processing for in situ resource utilization, Earth and Space 2018: Engineering for Extreme Environments, American Society of Civil Engineers, 2018, pp. 401-413, Reston, VA.

Ulas et al., 2013, Numerical analysis of regenerative cooling in liquid propellant rocket engines, Aerospace Science and Technology 24(1):187-197.

Vasavada, A. R., et al., "Near-Surface Temperatures on Mercury and the Moon and the Stability of Polar Ice Deposits". Icarus, 1999, vol. 141, pp. 179-193.

Wihite, Alan, et al., Evolved Human Space Exploration Architecture Using Commercial Launch/Propellant Depots, 63rd International Astronautical Congress, Naples, Italy, 2012.

Yildiz, K., et al, "Effective beam stiffness properties of n-strut cylindrical tensegrity towers", AIAA Journal, 2019, vol. 57(5), pp. 2185-2194.

Yildiz, K., et al., "A novel deployment strategy for tensegrity towers", AIAA Spacecraft Structures Conference, 2018, pp. 0693.

Zacny; Asteroid Mining; AIAA Space 2013 Conference and Exposition Sep. 10-12, 2013, San Diego, CA; AIAA 2013-5304; in 16 pages.

Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.

\* cited by examiner

--Prior Art--

OPTIMIZED MATCHED FILTER TRACKING OF SPACE OBJECTS

INCORPORATION BY REFERENCE TO ANY PRIORITY APPLICATIONS

This application is a continuation of U.S. Non-Provisional patent application Ser. No. 17/963,127, filed Oct. 10, 2022, which is based upon and claims the benefit of priority from U.S. Provisional Patent Application No. 63/367,031 filed on Jun. 24, 2022. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

Aspects of this disclosure relate to systems and methods using multiple coordinated telescopes for optical detection and tracking of optically faint or difficult to detect space objects, such as small asteroids or relic spacecraft.

Related Technology

Telescope imaging systems can be designed for computer control and analysis.

SUMMARY OF CERTAIN INVENTIVE ASPECTS

A multiple telescope imaging system can be designed to detect and track small, optically-faint moving objects in space. The multiple telescope system may be installed in one or more observatories on the ground, in a free-flying spacecraft in a near-earth orbit, etc. Matched filter tracking of faint objects can be performed with such systems. Massive computer processing over many captured images is typically involved in detecting faint moving objects.

Aspects of this disclosure describe search methods and data processing algorithms which can substantially reduce the amount of computer processing used for matched filter detection. Efficient methods allow data processing to be completed in real-time aboard spacecraft that may be equipped with relatively limited processing capability. Suitably equipped spacecraft can then transmit finalized detection and track data over communication links within the limited bandwidth typically available to small spacecraft. Timely, real-time tracking is desirable to provide warning of potential collisions between two spacecraft or between spacecraft and small asteroids. Tracking data can also be used to characterize small asteroids for their potential use in space mining operations. Tracking data can be used in maintenance operations to clean up and remove unwanted dead spacecraft and debris from near Earth space.

In some embodiments, a system is provided for reducing computational load in moving target detection analysis for faint moving objects. The system can comprise an optical system configured to project images onto a digital focal plane. The system can further comprise a digital focal plane including an optically sensitive array configured to capture imagery data by transducing light entering through the optical system into digital data that can be stored in memory and processed digitally, the imagery data comprising multiple images in which each of the images corresponds to the image data from the optically sensitive array for a given exposure time, the optically sensitive array having a resolution defined by the size of pixels and subsequent grouping of the pixels into bins. The system can further comprise a memory configured to store the imagery data. The system can further comprise an image processing system configured to analyze the imagery data to identify moving objects. This analysis can establish bins to match the bin size applied to the optically sensitive array and the resolution of the optical system, wherein each bin includes at least a number of pixels sufficient to capture a signal in the imagery data from a moving object as the signal of the moving object traverses the optically sensitive array over the course of the given exposure time. The analysis can further establish at least two tripwires on the focal plane of the optically sensitive array, each tripwire including at least one row or column of bins. The analysis can select a set of the images for processing. The analysis, can, for each image in the set, processing the bins in each tripwire without processing the other bins corresponding to other pixels in the image.

In some embodiments, a system can reduce computational load in moving target detection analysis for faint moving objects. The system can comprise a telescope having a first resolution and a digital camera including an optically sensitive array configured to capture imagery data from light entering through the telescope, the imagery data comprises multiple images, where each of the images corresponding to the image data from the optically sensitive array for a given time, the optically sensitive array having a second resolution. The system can further comprise a memory configured to store the imagery data and an image processing system configured to analyze the imagery data to identify faint moving objects. This system can accomplish this by establishing bins to avoid mismatch between the second resolution of the optically sensitive array and the first resolution of the telescope, wherein each bin includes at least a number of pixels sufficient to capture a signal in the imagery data from a moving object as the signal of the moving object traverses the optically sensitive array. The system can establish at least two tripwires on the focal plane of the optically sensitive array, each tripwire including at least one row or column of bins. The system can select a set of the images for processing and for each bin in the set, process the bins in each tripwire without processing the other bins corresponding to other pixels in the image.

In the described system, multiple telescopes can be combined into a single platform, wherein the multiple telescopes are configured to be aimed to simultaneously collect a plurality of images of adjacent regions of the sky, and wherein the image processing system is further configured to process the plurality of images singly or collectively in combination to detect and track the moving object. The moving object can be an object that is obscured by noise in the imagery data.

In some embodiments, the processor is further configured to establish the bins by calculating a bin size configured to improve a signal to noise ratio. In some embodiments, the processor is further configured to establish the tripwires by estimating a range of speeds for the moving object. In some embodiments, the processor is further configured to establish the tripwires by estimating a size of the moving object. In some embodiments, the processor is further configured to establish the set of images for processing by computing an additive stack of selected images containing the tripwire bins. In some embodiments, the optical system comprises a telescope and the system further comprises a camera including the digital focal plane. In some embodiments, the image processing system is further configured to determine an expected direction of travel of the moving object, and establish the bins to be elongated in the expected direction of travel. In some embodiments, the image processing system is further configured to establish temporal bins such that each of the temporal bins combines a stack of a plurality of exposures for each bin in the set, and adjust the number of exposures in each temporal bin based on an expected speed of the moving object.

A method is provided for the computational addition of recorded telescope images for detecting and characterizing faint objects which move through an image field of fixed stars. The method can comprise receiving a plurality of telescope images from a telescope imaging system and performing a plurality of computational calculations on the telescope images using a plurality of search parameters to identify one or more objects moving through the telescope images. The number of the computational calculations is reduced by a priori relatively restricting a parameter space of the computational calculations.

In some embodiments, a focal plane of the telescope imaging system is provided with an array of photoelectric detecting elements. The method can further comprise: computationally adding electrical responses of a number of adjacent photoelectric detecting elements to generate a numerical value of a synthesized data bin of an array of bins, wherein the number of photoelectric detecting elements contributing to the bin and an exposure time for light incident on the photoelectric detecting detectors are determined a priori by analytical calculations designed to enhance the signal-to-noise-ratio for detection of a restricted class of moving objects that are expected to pass through a field of view of the telescope imaging system. The method can further comprise processing one of the one or more moving objects in a subset of the telescope images via a computationally sparse sampling resulting in detecting the one or more moving objects above a background noise level of the images. The method can further comprise reprocessing the subset of telescope images at a higher resolution using limited portions of the subset of telescope images that are within a threshold distance of and within a threshold alignment along the directions of the processing of the one or more moving objects. The method can further comprise selecting a subset of tripwire bins for further processing, where the subset of tripwire bins form one or more rows, columns, or other shaped linear features projected upon the array of bins, wherein the tripwire bins are determined through a priori calculations to allow for the possibility of detection of the one or more moving objects. The method can further comprise processing the subset of tripwire bins, chosen a priori to obtain desired signal-to-noise ratio of the one or more moving objects, and processing the remaining tripwire bins and all other bins not previously processed to refine a calculation of location, speed, and brightness of the one or more moving objects.

In the method, sequentially captured images of the telescoping images can be represented by numerical arrays of pixel exposure levels, and the method can further comprise reprocessing pixel levels of the sequentially capture images into corresponding frames, each of the frames comprising an array of bins by numerically combining the levels of multiple adjacent pixels into a lesser number of corresponding bins. The method can further comprise sequentially shifting the frames in trial hypothesized directions to match possible velocities of motion and directions of motions of the one or more objects across the image plane, and in the sequentially shifted frames, adding overlapping bins bin-by-bin to form a shift-and-add stack.

The method can further comprise dynamically adjusting a binning ratio comprising the number of pixel elements contributing to each bin in each of the frames according to the magnitude of the velocity shift hypothesis, wherein the total number of bins in each of the frames depends on the shift velocity hypothesis for that particular shifted stack, wherein all of the frames in a stack have the same number of bins, wherein the binning ratio for each of the stacks is chosen to optimize the signal-to-noise ratio of one of the one or more objects moving with a velocity corresponding to the velocity of the shift hypothesis for that stack or within a limited range of that velocity.

In some embodiments, there is provided a system for reducing computational load in moving target detection analysis for faint moving objects. The system can comprise: an optical system configured to projects images onto a digital focal plane; a digital focal plane including an optically sensitive array configured to capture imagery data by transducing light entering through the optical system into digital data that can be stored in memory and processed digitally, the imagery data comprising multiple images in which each of the images corresponds to the imagery data from the optically sensitive array for an exposure time; a memory configured to store the imagery data; and an image processing system configured to analyze the imagery data to identify moving objects. This analysis can be accomplished by: establishing temporal bins such that each of the temporal bins combines a stack of a plurality of the images including at least one pixel in the optically sensitive array, wherein each temporal bin includes at least a number of images configured to capture a signal in the imagery data from a moving object as the signal of the moving object traverses the optically sensitive array over the course of a combination of the exposure times for the plurality of images; and detecting the moving object based on signals generated by the temporal bins.

The optical system can comprise a telescope and the system can have a camera including the digital focal plane. The system can combine multiple telescopes into a single platform. The multiple telescopes can be aimed to simultaneously collect a plurality of images of adjacent regions of the sky, and the image processing system can be configured to process the plurality of images singly or collectively in combination to detect and track the moving object. The moving object can be an object that is obscured by noise in the imagery data. The image processing system can be further configured to analyze the imagery data to identify moving objects by: establishing at least two temporal tripwires, each tripwire including at least one row or column of bins in at least one of the exposures; selecting a set of the images for processing; and for each bin in the stack, processing the bins in each tripwire without processing the other bins corresponding to other pixels in the image.

DETAILED DESCRIPTION

FIGS. 1 through 5 illustrate traditional methods of matched filter tracking. FIG. 6 illustrates aspects of this disclosure that can reduce data processing loads by up to 1000 times.

Figure 1:
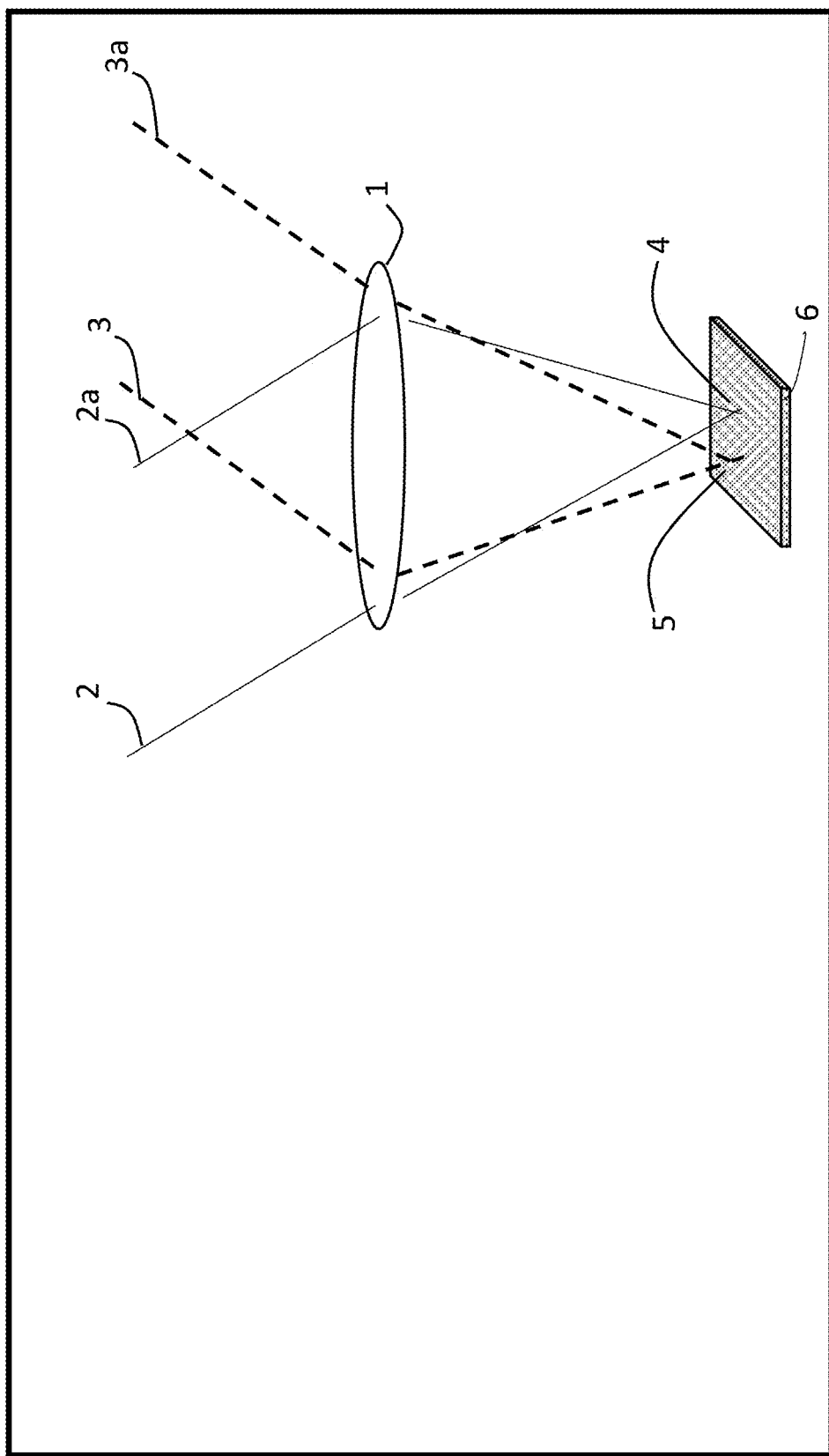
FIG. 1 illustrates the operation of a telescope equipped with an electronic focal plane detector, also known as a focal-plane camera.

Referring to FIG. 1, a notional telescope captures a temporal sequence of images containing background sky, fixed stars/galaxies, and objects which appear to move across the field of view. Light from a distant star enters the entrance aperture 1 of a telescope, represented by a large objective lens. The entrance aperture may be a large curved mirror, objective lens, or a combination of mirrors and lenses. Parallel incoming light from a first star, defined by boundary rays 2 and 2a, converges to a focus at position 4. Similarly, parallel light from a second star located in a different direction is defined by boundary rays 3 and 3a which converge to a different position at focus 5. A two-dimensional rectangular array of photo detectors 6 electronically records the intensity of light falling upon each photo detector element in the array. The number of detected photoelectrons increases in proportion to the apparent brightness of each object in the field of view and also in proportion to the exposure time. The exposure time is selected according to the goals of the observational task. For example, the exposure time may be relatively short to not overexpose bright objects or may be relatively long to detect faint objects. The light intensity values are stored as digital numbers in a detector's array buffer and then transmitted to a processing computer, not shown in the figure. The surface of the detector array 6 is arranged to lie at the focal plane of the telescope objective in order to produce the smallest possible image spot which will overlap the fewest possible photo detector elements or pixels.

Figure 2:
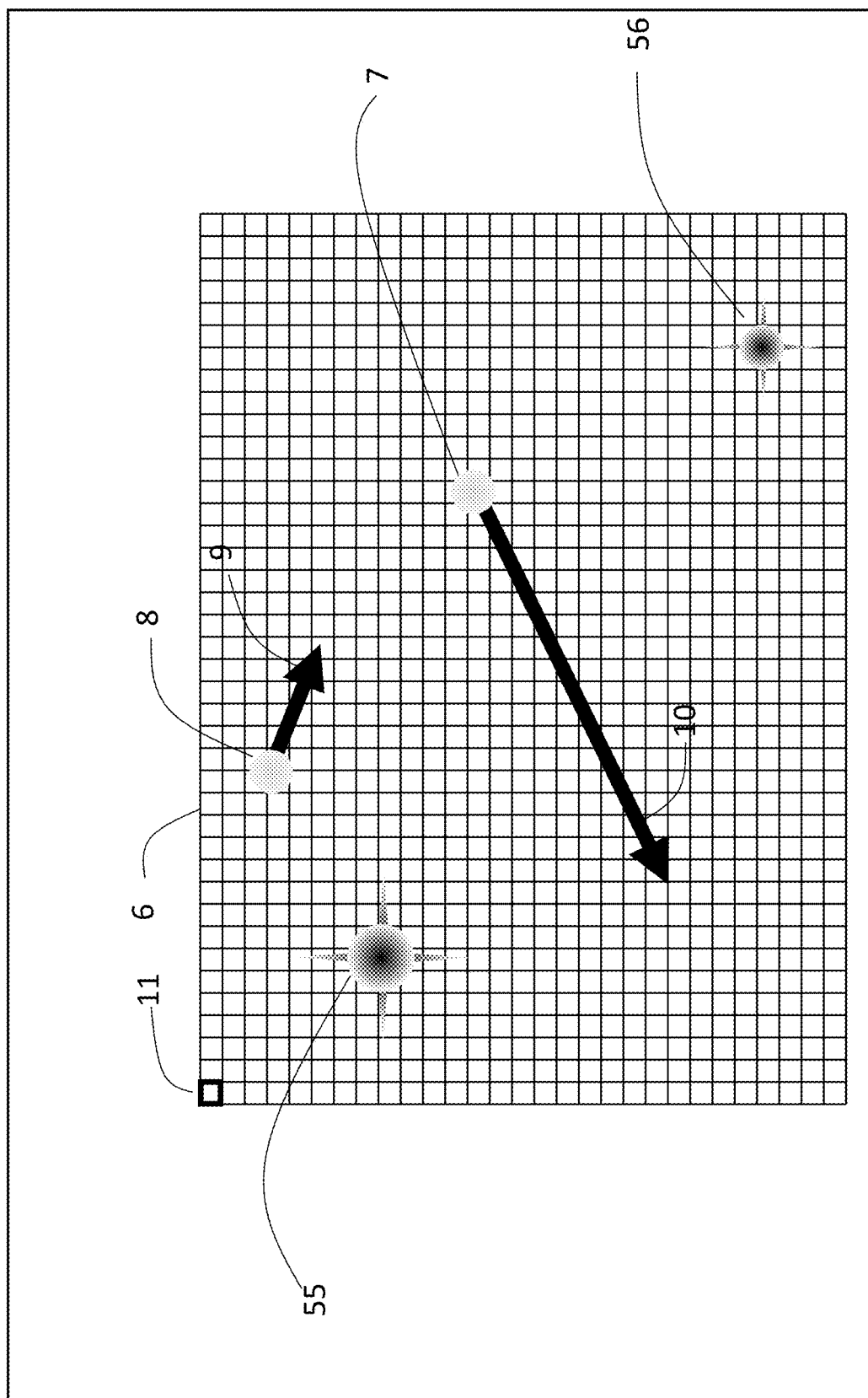
FIG. 2 illustrates the relative positions upon a focal plane array of images of bright stars and also faint moving objects.

FIG. 2 illustrates a plan view of the detector array 6. A single detector element 11, also termed a picture element or pixel 11, is outlined in bold lines. Images of the first bright star 55 and second less bright star 56 overlap several detector elements. That overlap is an intentional design feature given the optical train characteristics, seeing conditions, and detector characteristics that are discussed further below. Also detected are fainter moving objects 7 and 8. For telescopes fixed to the surface of the Earth, the field of stars will appear to move across the sky due to the rotation of planet Earth. If the telescope is caused to move in exact compensation for the rotation of Earth, the images of stars 55 and 56 will not appear to move across the detector array 6. Distant stars are generally termed to be "fixed" stars, since the relative spacing and patterns of the stars do not appear to change over the time scales of the image sequence collection. Objects that move relative to the background of fixed stars, such as images 7 and 8, will be seen to move across the detector array 6 over a period of time as indicated by the notional wide arrows 9 and 10. In this representation, the direction of the arrows 9 and 10 indicates the direction of motion of the focused image while the length of the arrows 9 and 10 indicates the speed of motion.

FIG. 2 further shows that each of the various focused images has a size that covers several adjacent image pixels. Images of distant stars have a constant size on the focal plane as constrained by the spatial sampling capabilities of the optical system. The image size on the focal plane does not represent the true size of the distant stars. Rather, the image size is determined by the diffraction limit of the telescope aperture plus, for ground-based telescopes, any additional broadening due to atmospheric turbulence or other degraded "seeing" conditions. Imaging systems are intentionally designed such that the image on the focal plane of a distant unresolved point source object will span several pixels. For a given telescope aperture diameter, the point-spread function becomes smaller as the focal length is reduced. Simultaneously with a smaller image size, the amount of light (number of photons) falling on each pixel increases, up to the point where all of the light from the object that illuminates the telescope is focused to a point-spread function wholly contained within a single pixel.

When a focused image (e.g., the received signal of a particular star) spans several pixels, detector elements nearer the center of the image register brighter light levels. It is possible through post-processing of the recorded image to calculate the location of star images to sub-pixel accuracy. The processing method applies interpolation and curve fitting to the expected spatial focal spot intensity profile. The final calculated position has higher accuracy than would be possible if the image spot size were entirely contained on a single pixel. This method of calculation is referred to as "centroiding". It is a key step in the process known as "astrometry" that accurately maps focal plane coordinates to celestial coordinates. For example, it is desirable to have high precision, high accuracy astrometry when tracking unknown asteroids in order to accurately compute their Keplerian orbital parameters. Accurate tracking can determine whether an asteroid may be on a collision course with Earth or a spacecraft.

Figure 3:
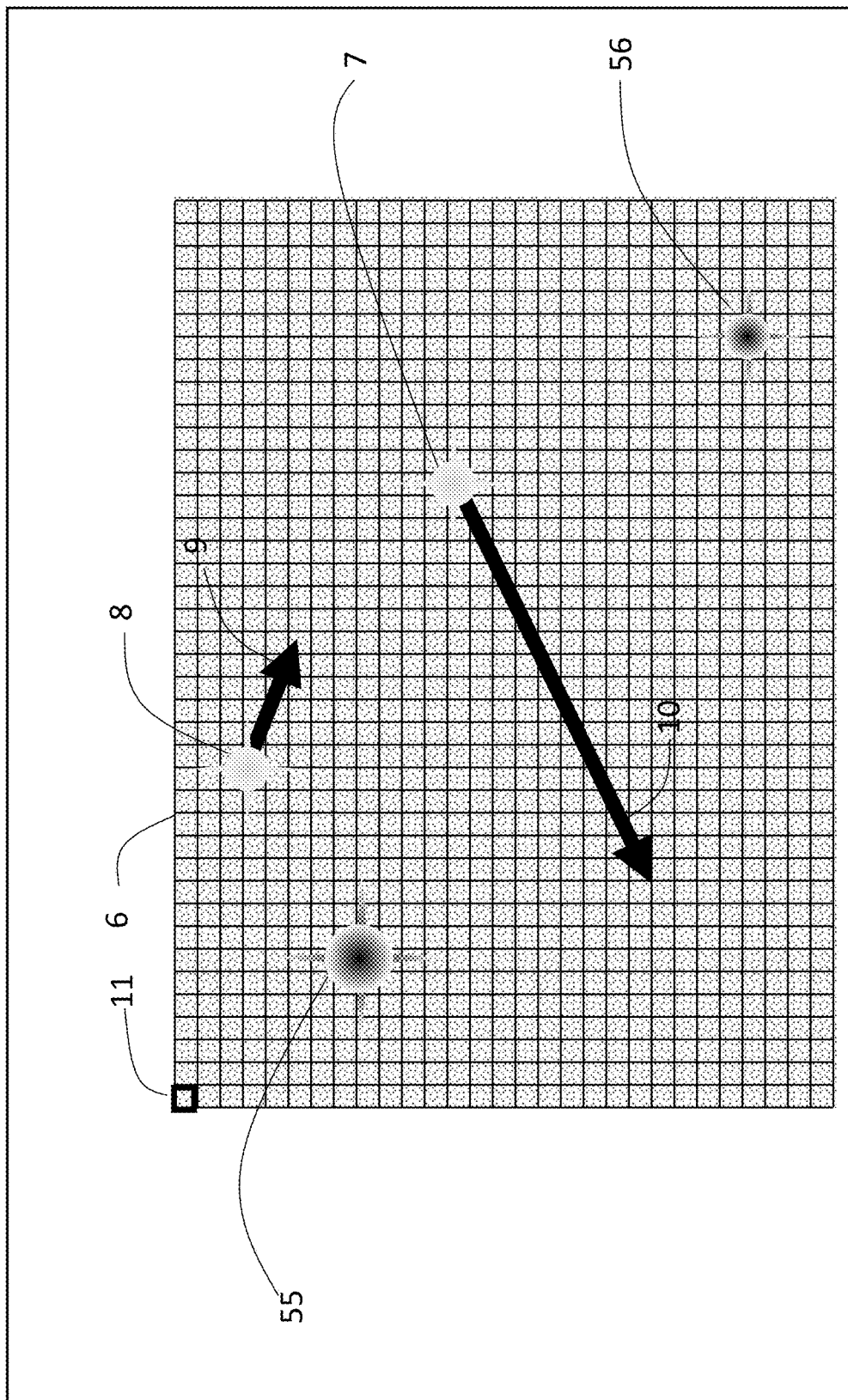
FIG. 3 illustrates the effects of noise that is always present in telescopic images.

FIG. 3 illustrates the presence of noise in the detection process. There are many possible sources for image noise that are fundamentally difficult or impossible to eliminate. Sources of noise include but are not limited to: atmospheric sky glow, dust reflection, terrestrial light pollution in the wavelength band of the detector, zodiacal background light due to reflected sunlight from dust particles in the Solar System, and diffuse objects in deep space such as galaxies, nebulae, and the Milky Way. Instrumentation noise sources include but are not limited to: detector thermal noise, quantum-level shot noise in the detectors related to the brightness of light on each pixel, electronic read-out noise, and hot pixels. The net result is that faint objects may be obscured by noise in the image. For telescopes in orbit beyond the atmosphere of Earth, the largest noise sources are typically electronic read-out noise and cosmic ray interference.

Thermal noise (a.k.a. dark current or pixel leakage current) is a factor for long exposures. Shot noise is described as the noise associated with the variance of the photon arrival rate from an object at the telescope sensor. It is a quantum effect due to the fixed and finite charge of electrons used in the photo detection process. Thermal noise and shot noise are non-steady noise sources which vary with time in each pixel. Other sources of noise contribute to uneven intensities in the spatial domain of the focal plane, for example spatial image background sources such as the zodiacal light, deep space clouds, galaxies, dust in the atmosphere, transparent cirrus clouds, etc. The total background can represent a spatially non-uniform background level with a time-varying shot noise component included. Accordingly, successive images of the same fixed region in space will show the same fixed stars but with different background noise. When tracking a faint moving object (aka target) through successive images, the image will be superimposed upon a changing background of spatial and temporal noise. It is advantageous to develop multiple-image processing methods which can enhance the detection of faint moving targets and suppress the contributions from stationary objects and noise source.

Image-addition is designed to detect the faintest possible targets by adding together and averaging multiple images of a target. If a faint target is always present across the same group of pixels, then adding multiple independent images will linearly increase the signal level of the target. Many types of noise fluctuate independently from one image to the next and will not add up as quickly as light reflecting or emanating from faint targets. By adding the pixel-by-pixel intensity of many successive images, the intensity of a signal from the target will grow faster than the noise intensity. The resulting addition of many images (e.g., N=10, 100, etc.) is referred to as an image stack. Statistical theory predicts that the noise strength adds in quadrature and being Poisson (shot noise), grows like the sqrt(N), whereas the signal strength grows as N. Thus the per pixel signal-to-noise ratio SNR increases as sqrt(N).

Figure 4:
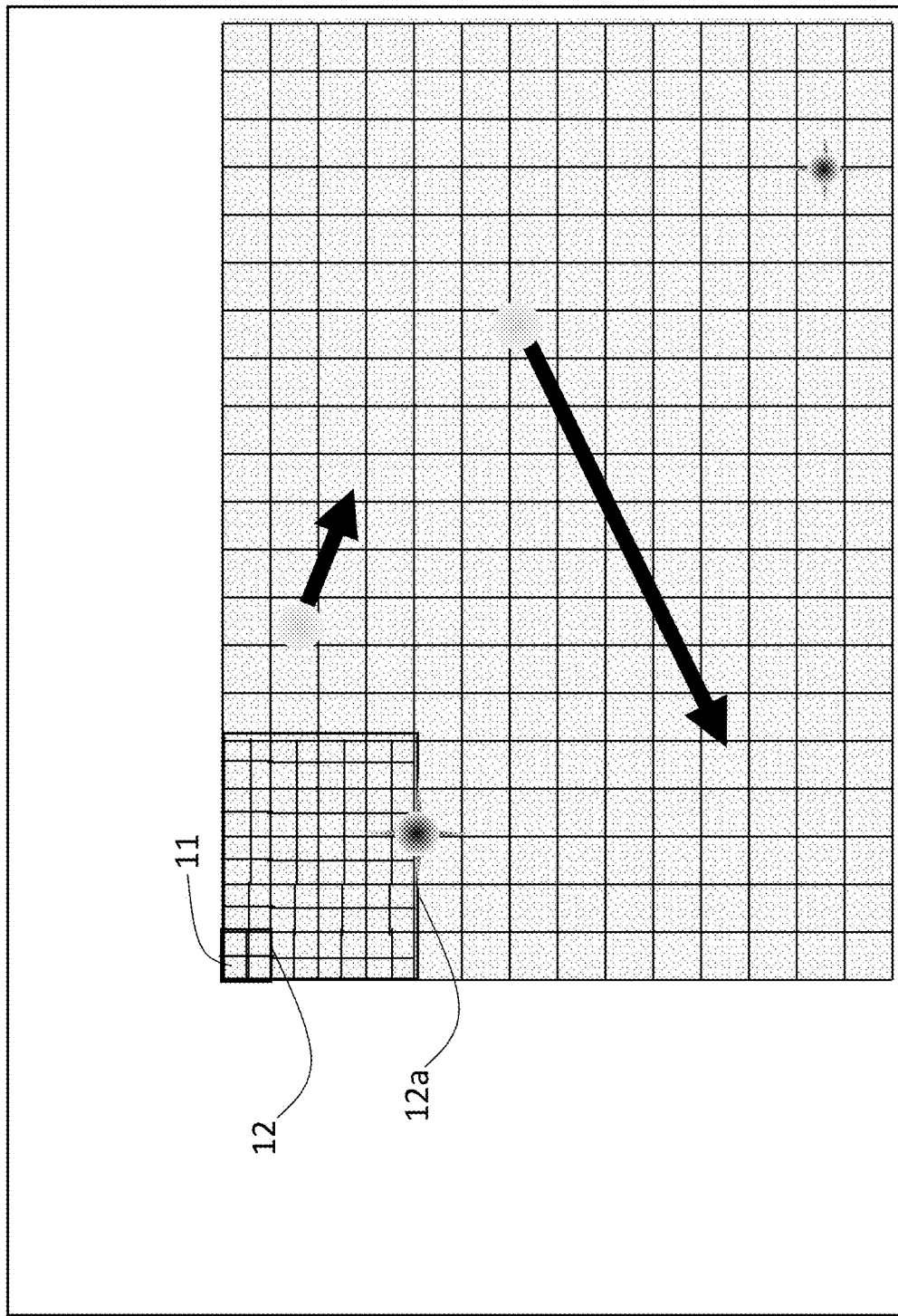
FIG. 4 illustrates a method of aggregating multiple image pixels into a smaller number of bins in order to improve signal-to-noise ratios and to reduce the required processing load.

FIG. 4 illustrates yet another method to increase signal-to-noise detection levels for faint targets. In this method the recorded intensity from a single pixel 11 has been added to the intensities from 3 adjacent pixels. The sum of intensities from the 4 adjacent pixels (using 2×2 averaging) is represented as a single larger group 12, generally called a bin. The two-dimensional arrangement of bins may be called a frame. The binning process may combine the intensity readings from more than 4 adjacent pixels. For example, the contributions of an area of (10×10)=100 pixels may be combined into a larger bin 12a. Binning is a processing strategy that, in some cases, can increase or improve the detectability of faint targets. Binning can have various results, including SNR gain. Binning reduces the number of computational elements and the corresponding computational load that must be employed in subsequent image processing, as described below. However, binning may also reduce the accuracy of astrometry measurements, since bins can be spatially larger and reduce the image plane spatial resolution. (As explained further herein, bins can also be enlarged temporally). In some cases, binning can result in a loss of SNR if the signal is in only one pixel, but the noise is contributed from all other pixels in the bin (e.g., four or one hundred pixels, or any other sized bin). Note that binning via adjacent pixel averaging is only one method of the more general concept of spatial down-sampling that could be used to reduce total bin count and retain or enhance SNR.

Figure 5:
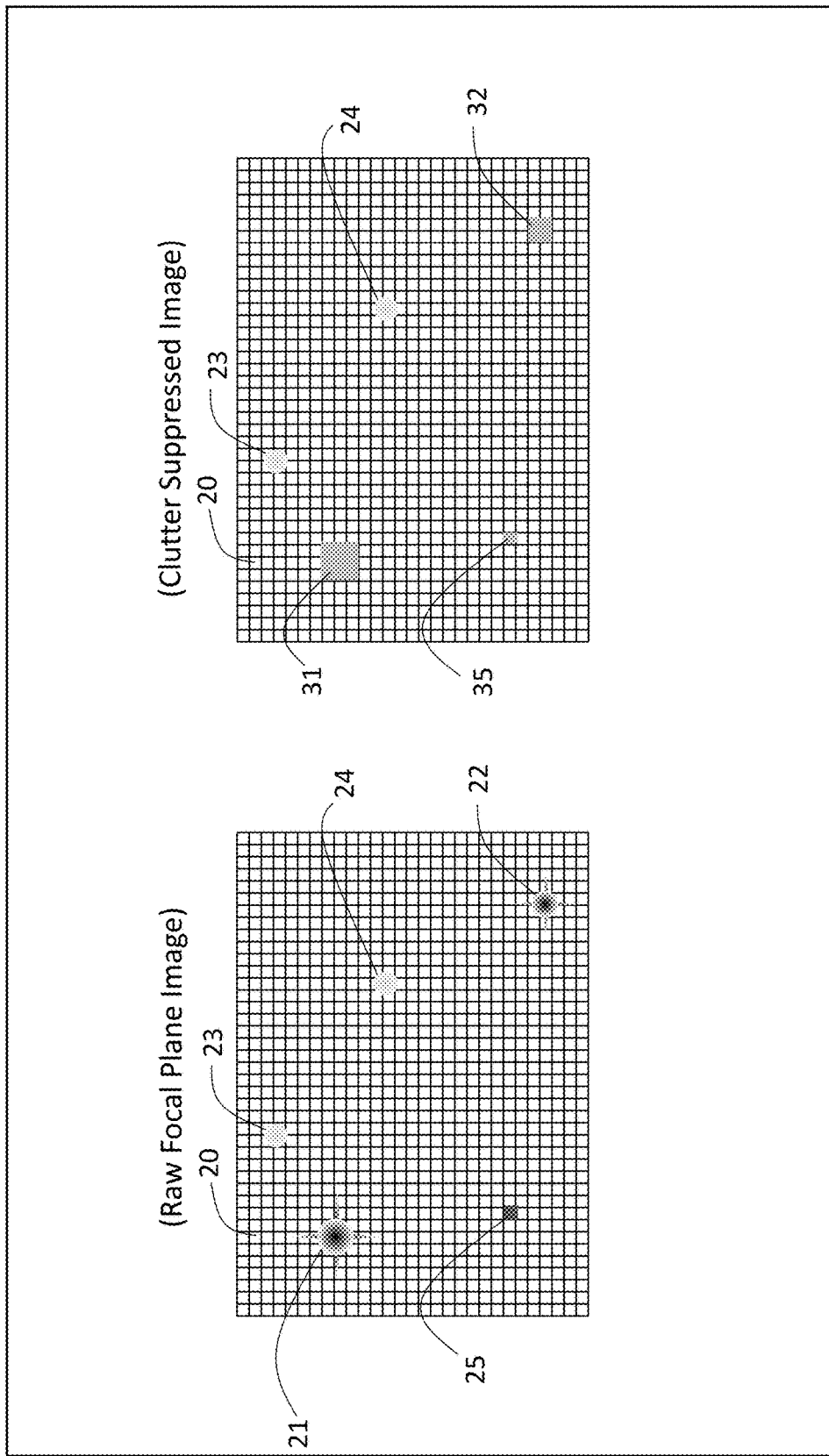
FIG. 5 illustrates pixel-level clutter suppression where pixel values of temporally stationary objects and background are either removed or minimized to a low-level value.
Figure 6:
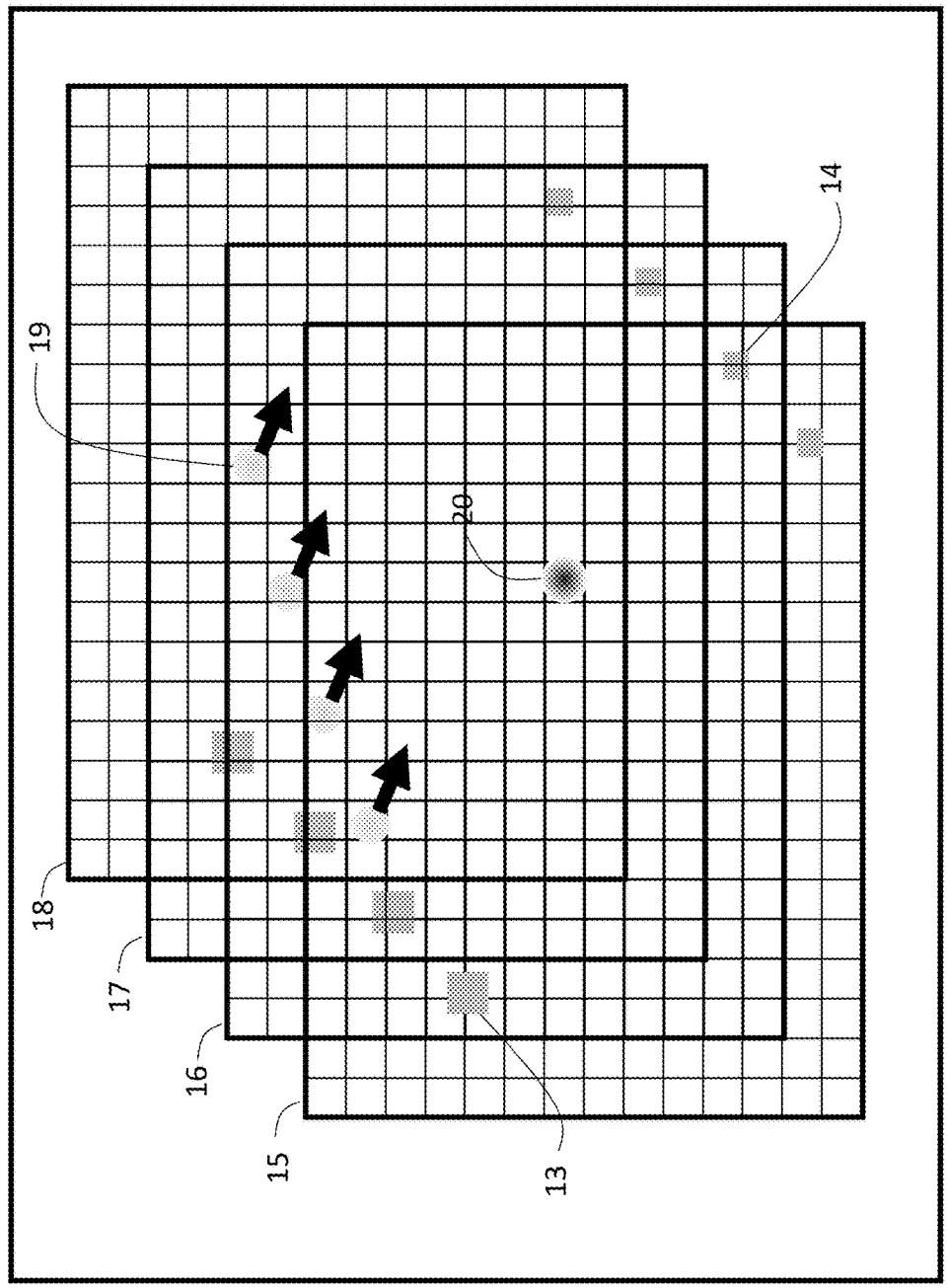
FIG. 6 illustrates the shift-and-add method of matched filter tracking for detection of faint moving objects.

FIG. 5 illustrates a method of clutter suppression. In the present application, clutter generally refers to light from the background and fixed targets above the background which may obscure the presence of fainter moving targets. The clutter suppression process removes or reduces temporally stationary features across a sequence of registered images or frames. Clutter suppression can be performed at the pixel level or at the bin level respectively. In the example of FIG. 5, clutter includes the background noise sources plus fixed image features such as stars 21 and 22, galaxies, nebulae, et cetera, that can obscure the intensity of the desired faint moving targets 23 and 24. In some embodiments of clutter suppression, pixel values can be replaced in the recorded image sequence with a median intensity level. The median level may be the intensity level of a locally spatial and temporal sub-image sequence, in which half of the sorted group of pixel intensities are brighter and half are fainter. Since most of the image pixels 20 contain no bright targets, the median level will be relatively low. Star images are replaced by relatively low intensity background pixel levels 31 and 32.

In some embodiments, clutter suppression can comprise estimating the mean, median, or mean-median for each pixel. The estimates can be locally spatial, purely temporal, as used in tracking moving objects, or a space-time combination of both. In the mean-median process, a few values around the temporal median value are averaged to give greater robustness to outliers. The term median may apply to various approaches used to estimate the stationary background. As illustrated in FIG. 5, a median value can be subtracted from the focused image of an object. The process is intended to reduce the signal from stars (and other stationary background sources in general) to the remaining shot noise level.

Clutter suppression also can involve the reduction of shot noise variance by de-emphasizing a formerly bright star pixel that contains large shot noise. This is done through a per pixel noise covariance estimation and applying an inverse covariance to the mean (median) of the removed image. The process is otherwise known as whitening. To avoid clutter suppressing slow moving features it can be advantageous to perform clutter suppression on the images before binning into frames.

Clutter suppression can also mitigate the effects of "hot" pixels 25 and cosmic ray strikes. A hot pixel is a rare defect in the focal plane detector array wherein an isolated pixel does not respond to incoming light but intermittently displays a large or maximum intensity value depending on the defect, such as a sticky bit. In some embodiments, steady state hot pixels can be removed upstream in the processing pipeline through dark subtraction and flat fielding. Cosmic rays show up as spatially localized bright pixel flares in one or two temporally adjacent images. Median based clutter suppression can replace bright cosmic ray intensities with a lower level spatial and/or temporal background value.

Matched Filter Tracking Prior Art

FIG. 6 illustrates a method of Matched Filter Tracking (MFT), which will hereinafter be referred to as the MFT method. Assume first that a faint target, such as target 7 in FIG. 3, is known to be moving in a known direction at a known speed. The MFT process sequentially records multiple images 15 through 18 at known time intervals for bin-level processing of frames. Each image is shifted in a direction opposite the apparent motion of the faint target across the detector array. The distance of shift is adjusted to match the pixel distance of motion of the faint target during the known time between image captures. The resulting shifted images are then added pixel-by-pixel or bin-by-bin to form an image stack. As in the case described above of "shifted and stacked" image addition, this summation process in FIG. 6 can increase the apparent intensity of the faint image 20 relative to the noise background.

It can also be seen from FIG. 6 that fixed stars 13 and 14 and other non-moving targets will not line up under the shifted images. Images of non-moving targets above the background may appear as streaks or as a series of co-linear features in the combined shifted image stack. Furthermore, images of moving targets 19 that do not move in the assumed shift direction or by the assumed shift distance will not be repetitively added. Those images will accordingly remain faint in the combined image stack. Successful clutter suppression prior to matched filter processing (described above with respect to FIG. 5), can further minimize contaminating features from stationary objects and stars.

The direction of motion of unknown targets can not be known. A search for unknown objects may be constrained if the search is limited to objects within a population of known properties. Therefore, traditional MFT methods may compute many trial shifted stacks covering a range of possible faint target motions. For example, 5000 trial motion hypotheses may perform the shift-and-stack computation by repeatedly processing the recorded information in 100 clutter-suppressed pixel image frames or 100 binned frames.

Optimized Matched Filter Tracking, OMFT

Many MFT applications do not have constraining information about the position, direction and speed of a target for detection or tracking. In those cases, a very large number of trial hypotheses must be tested. Thus, MFT may not be feasible for spacecraft applications due to its high runtime costs associated with hypothesizing huge numbers of motion vectors. In instances when a target's motion is limited in scope of either position, direction, and/or speed, or the target's velocity vector is well known a priori by some other means, then the MF motion hypotheses may be constrained to a reasonable computational load that can be executed on a spacecraft.

It is desirable to have an MFT method that can detect faint targets even when the starting position, direction of motion and the speed of faint objects is not known a priori. Detection and tracking of unknown moving objects can require far more computational throughput than for known objects.

The computational load of an MFT method can be high. For example, a contemporary focal plane array may include rows and columns of detector elements numbering perhaps 6,000 by 6,000 pixels. The total number of detector elements or pixels in that array is then 36 million. A typical search for faint moving objects might require 5,000 or more trial motion vectors over a stack of 100 images. The number of discrete pixel additions then exceeds $(36,000,000) \times (5000) \times (100) = 1.8 \times 10^{13}$ calculations (about 2,000 billion).

This calculation assumes nearest neighbor integer shifting. Better detection performance may be obtained through bilinear interpolation in the shift and stack, but this can result in a further scaling up by a factor of 4 in floating point operations flop count. The numerical value of each pixel may be represented as 8 bit integers or 32 bits of single precision floating point memory. Thus, the total number of bit manipulations could be on the order of $10^{14}$ (one hundred thousand billion) to search for an unknown moving object. For spacecraft operations, such a high number of trial manipulations may not be desirable due to bandwidth limitations, available processing power, electrical energy required to power the processor, or time constraints.

In a related example, a pixel may be represented by a 2-byte instead of the previously described 1 byte integer. Flat fielding, another form of clutter suppression, can require 4-byte float data calculations. Accordingly, it is possible to sacrifice some signal discretization and resolution by using integer values. Discretized integer algorithms require fewer computational resources than the full resolution floating point operations. Discretized operations may also reduce computational requirements by using integer shifting and adding with address lookup without bilinear interpolation.

Nevertheless, some ability to detect may be lost in the process. These are some of the many tradeoffs that depend on computing architecture and processing resources available.

It is desirable to reduce the number of computations required for MFT to a level feasible for on-board processing in small spacecraft and also with large focal plane arrays on the ground. This disclosure refers to this method as Optimized Matched Filter Tracking (hereinafter referred to as OMFT). One novel aspect is that search parameters may be customized and substantially simplified when the purpose of the search is to discover a particular limited class of moving objects while fully utilizing a fixed amount of computing capability. For example: searchers may be specifically looking only for objects on a collision course with Earth; or only for objects within a specified speed range; or only for objects in commercially accessible orbits; or only for an initial low-resolution search and detection in order to cue other sensors for follow up investigations; or for artificial objects in particular types of orbits. Since the image stacking process does not destroy information the same data set may be processed sequentially or in parallel by multiple algorithms for multiple purposes. The specific requirements of the search determine the efficient parameter space to be investigated. As described herein, OMFT can include making bins out of the pixels in an optically sensitive array and increasing exposure time by an amount corresponding to the speed of an expected target (e.g., how long you the target is expected to stay in the bin).

Figure 7:
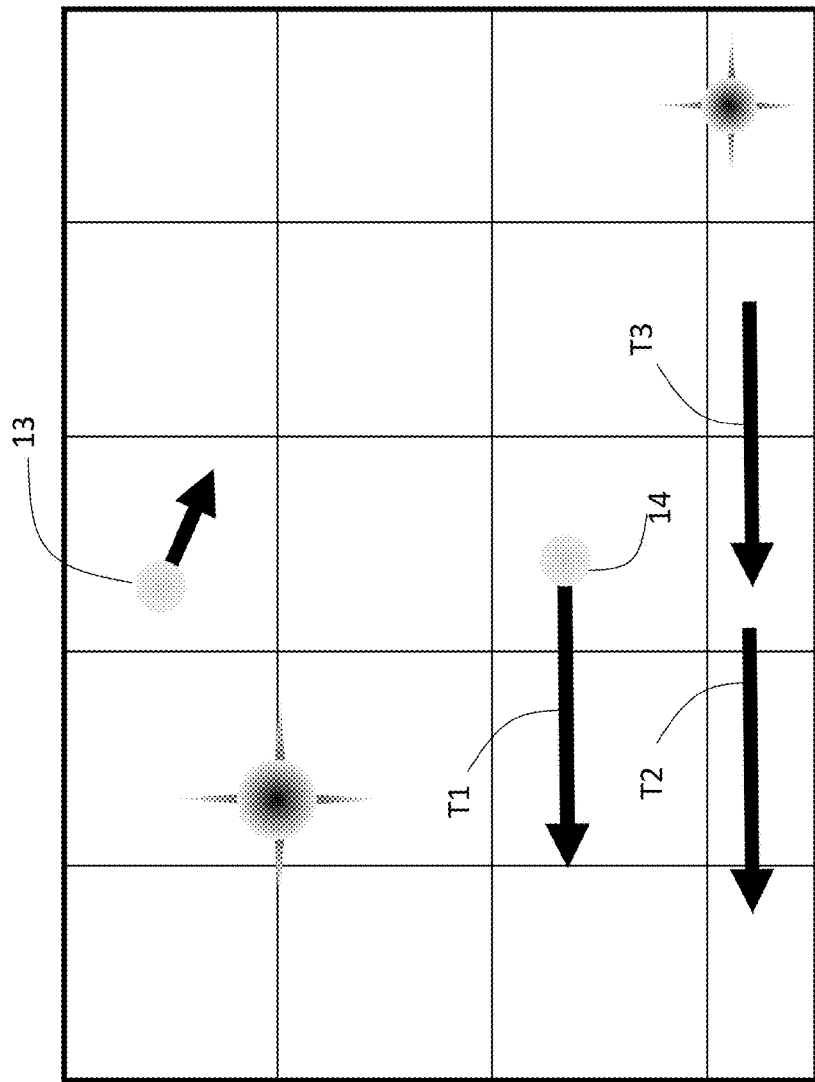
FIG. 7 illustrates a method for determining the computationally optimum size of a bin on a focal plane and the number of pixels in a bin based on the expected speed of faint objects across the focal plane.

FIG. 7 illustrates a method of searching for objects within a range of speeds and brightness given in stellar V-magnitudes by the method of adjusting bin size. The bin size and pixel exposure time are adjusted based on the attributes of the desired target. It is desirable to search for faint objects which can be threshold detected after adding a large number of frames, that have been motion aligned in a stack.

A faint object such as an asteroid or spacecraft may have a Signal-to-Noise-Ratio (SNR) less than 2.0 and often less than 0.5 in a single exposure taken by reasonable telescope systems. Noise in different bins varies between the bins but the faint object's signal will be approximately the same in each bin. Adding the intensity values of many bins will generally (but not always) increase the SNR up to a desired or optimal value. Optimizing the detection capabilities requires balancing all parameters including: bin size, exposure period, observational strategy, telescope and detector characteristics, target characteristics, and computational capabilities.

As illustrated in FIG. 7, slow targets 13 stay in a particular bin longer than faster targets 14. When searching for slow targets, the primary pixel data may be combined into large bins and the exposure time for the primary pixels may be relatively long. The objective is to keep a slower target entirely within a single bin during an exposure time. Faster targets move across multiple bins and therefore do not contribute as much brightness energy to each bin. With this approach (with larger bins and matching exposure time for the primary raw pixels), targets at the desired speeds will be preferentially detected relative to faster targets.

The binning process is computationally efficient. The subsequent shift-and-add stacking process can follow with far fewer bins to shift and add than the image pixels, thereby reducing the computational load. Additionally, binning reduces the number of possible velocity hypotheses for a given maximum velocity search range, further constraining the computation needs at the expense of initial velocity measurement accuracy. When reduced resolution processing detects a moving object, the position and velocity with higher accuracy can be recovered by reprocessing the primary raw image (fine pixel resolution) sequence over a highly restricted range of motion trial vectors. For example, the reprocessing may involve processing limited portions of the primary raw image within a threshold distance of and within a threshold alignment along the directions of the first lower resolution detection.

For faster targets 14, the bin size and exposure time per bin can be chosen to approximately match the transit time of the faster target across a multiple-pixel aggregated bin. FIG. 7 illustrates three possible cases for a fast-moving target during a single exposure. In case 1, the track designated T1 is contained in exactly two adjacent pixels. In case 2, the track designated T2 is present in all or part of three pixels. In case 3, track T3 is partially contained in two adjacent pixels. Bin size can be adjusted to contain just the number of pixels that a fast mover is expected to illuminate during the exposure time of a single image. In this case, the optimal number of pixels (n) on a side of a bin would be about 3. Each bin would contain 3 rows×3 columns=9 adjacent pixels.

Figure 8:
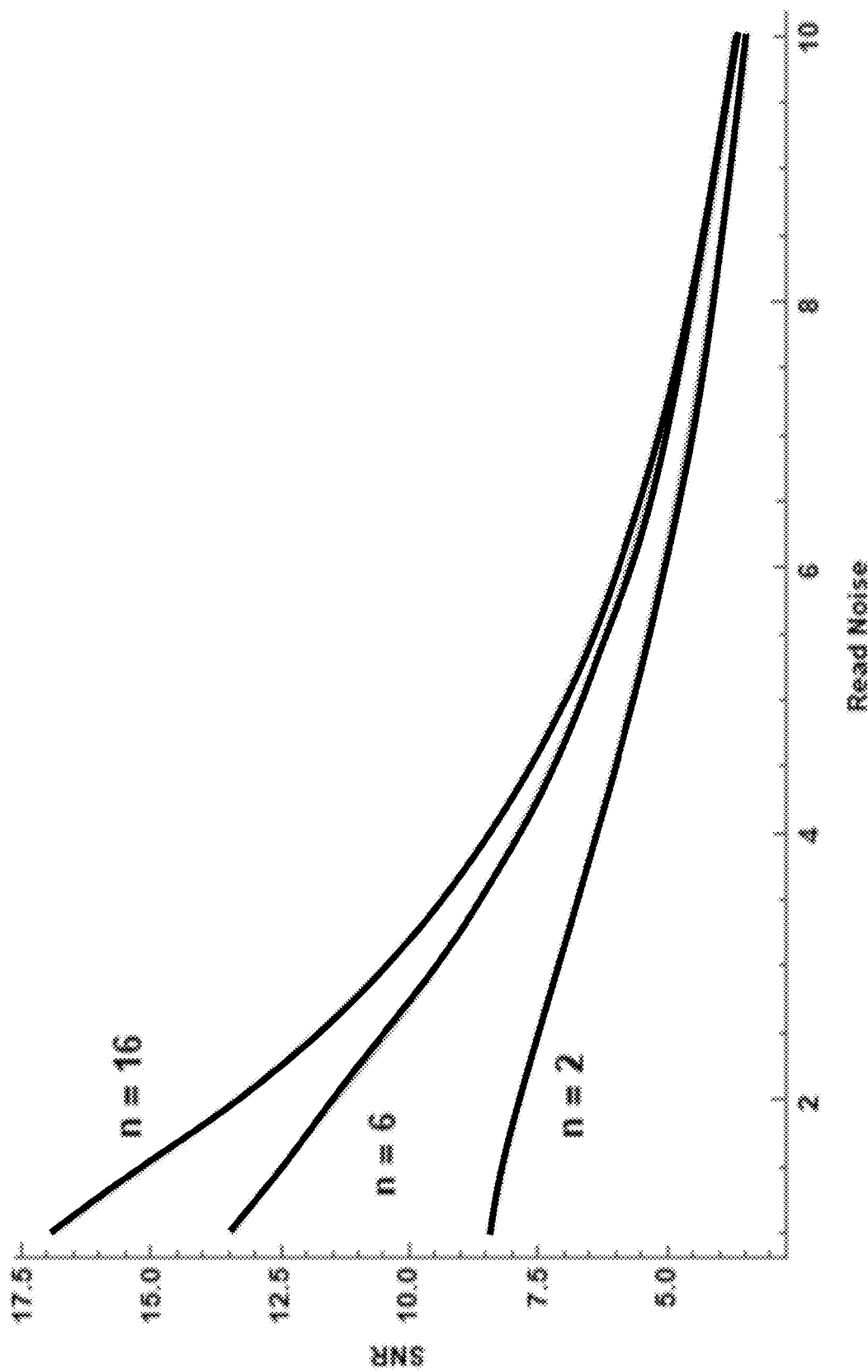
FIG. 8 illustrates how SNR may be optimized by adjusting bin size in the presence of electronic readout noise.
Figure 9:
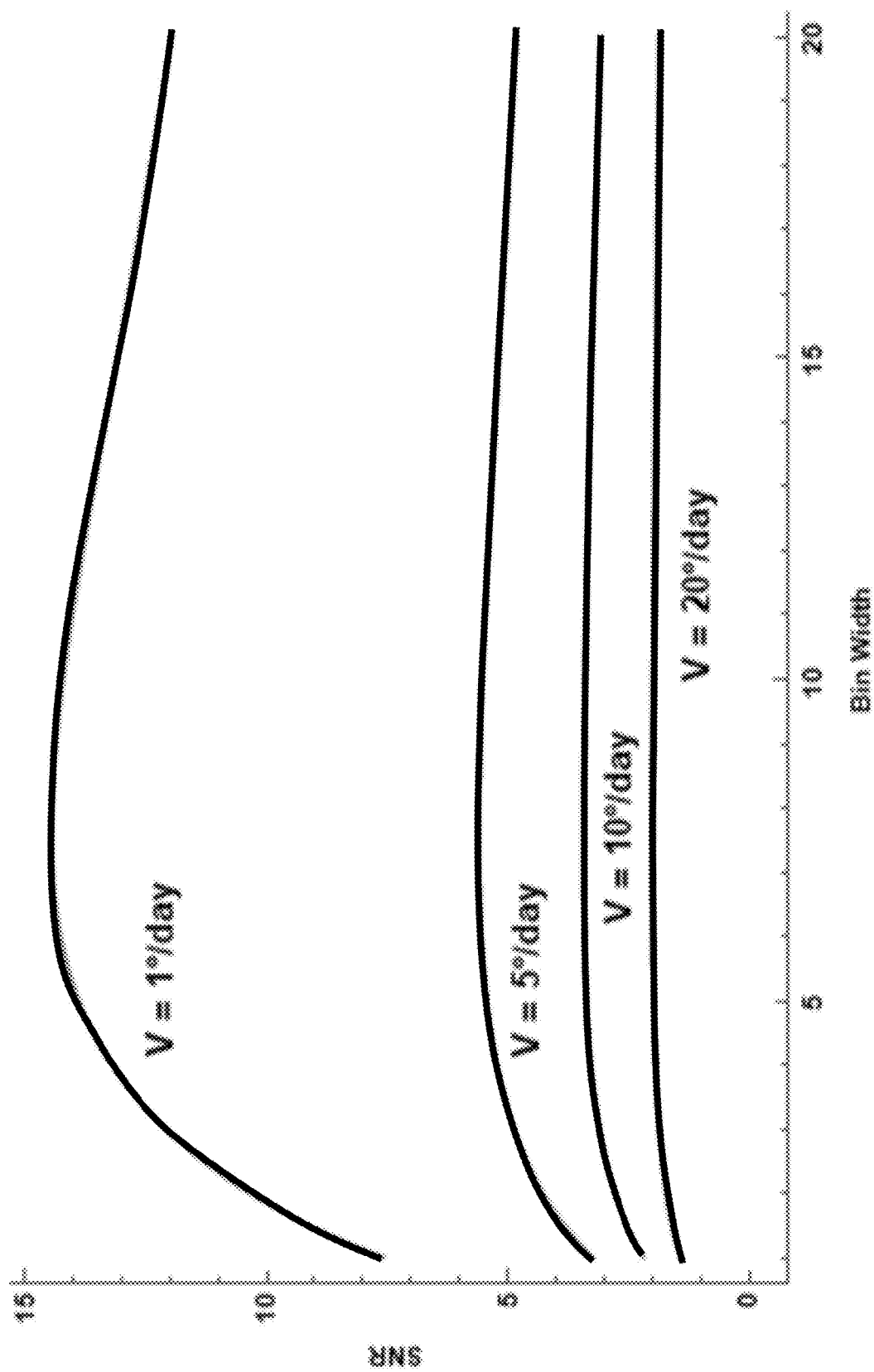
FIG. 9 illustrates how bin size and optimal exposure time may be adjusted to accommodate various target speeds as measured in angular movement per day across the sky.
Figure 10:
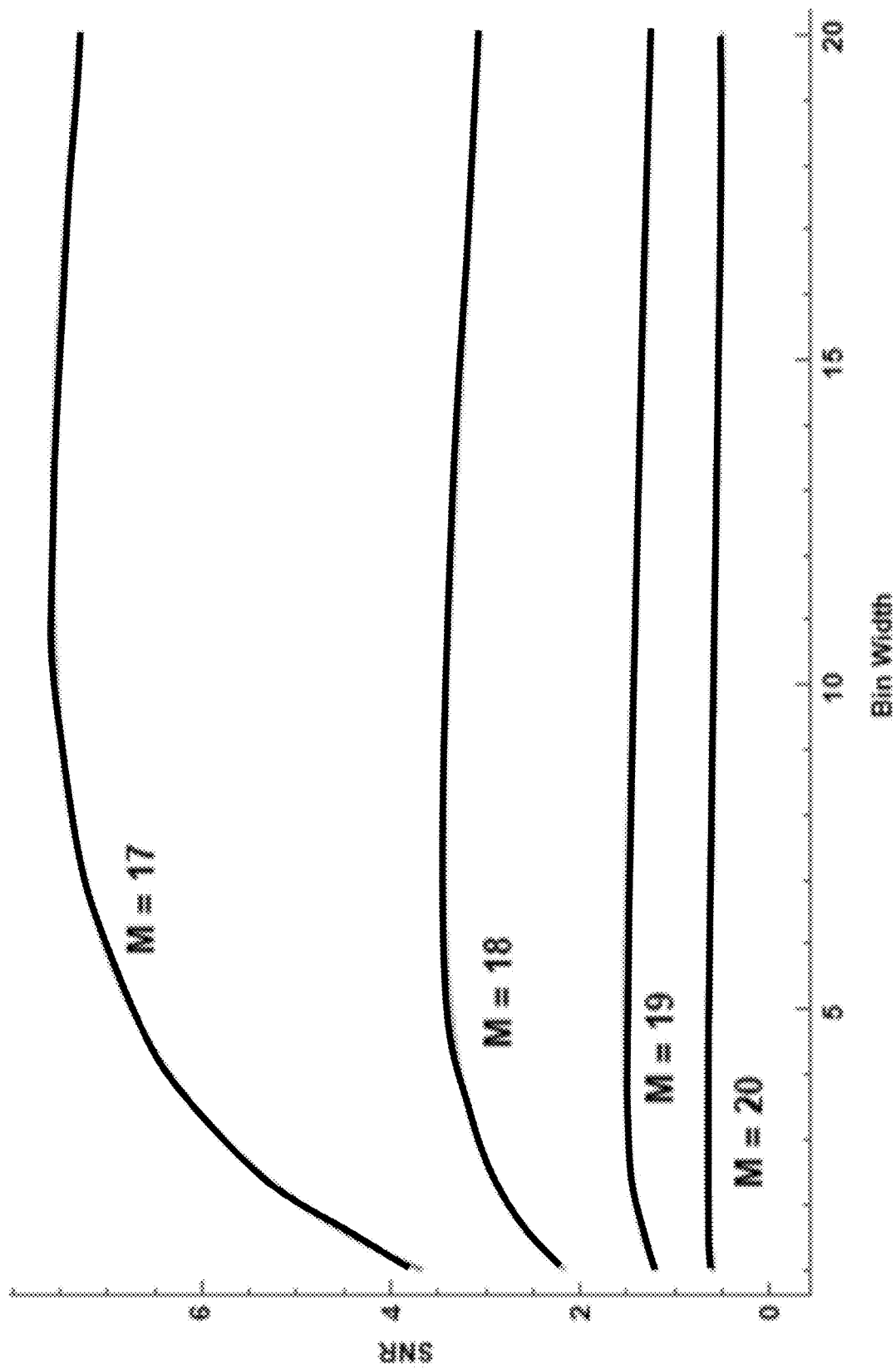
FIG. 10 illustrates how the width of a bin measured in pixels may be adjusted to change the SNR depending on the magnitude of faint targets.

The bin size and exposure time per bin can be selected to match an optimal multiple of the transit time of a faster target across a bin. A nearly optimal bin size may be determined for a specific target speed and brightness by Monte Carlo simulations and/or calculated analytically based on statistical assumptions. There are many variables to adjust for each specific case. FIG. 8 illustrates how SNR may be optimized by adjusting bin size in the presence of electronic readout noise. FIG. 9 illustrates how bin size and optimal exposure time may be adjusted to accommodate various target speeds as measured in angular movement per day across the sky. FIG. 10 illustrates how the width of a bin measured in pixels may be adjusted to change the SNR depending on the magnitude of faint targets. Magnitude is defined in the astronomical community to designate fainter targets with larger stellar magnitude numbers by taking −2.5 times the base ten logarithm of the target's intensity (lower intensity=higher magnitude value).

In some embodiments, the bin shape may be adjusted based on the expected direction of travel of a target. For example, a target may move in a horizontal direction with respect to the pixels of an optically sensitive array. Thus, by elongating the bins in the horizontal direction, targets travelling horizontally can be better detected. Other bin shapes are also possible when the expected direction of a target is in another direction (e.g., vertical, diagonal, etc.). When targets are expected to be uniformly distributed in all azimuths (e.g., isotopically distributed), the bins can be shaped to be substantially symmetrical. When targets are expected to be anisotropically distributed, the bins can be sized/shaped to match the expected speed distribution of the targets.

Advantageously, noise can be reduced by sizing and/or shaping the bins according to the expected directionality of the targets by reducing the number of pixels in a bin that are unlikely to detect a target. For example, for a 5×5 bin, some noise sources may be 25-times that of a 1×1 bin. However a 5×2 bin may only have 10-times the amount of noise as a 1×1 bin. Thus, adjusting the bin size/shape can reduce noise, thereby increasing the signal to noise ratio.

Figure 11:
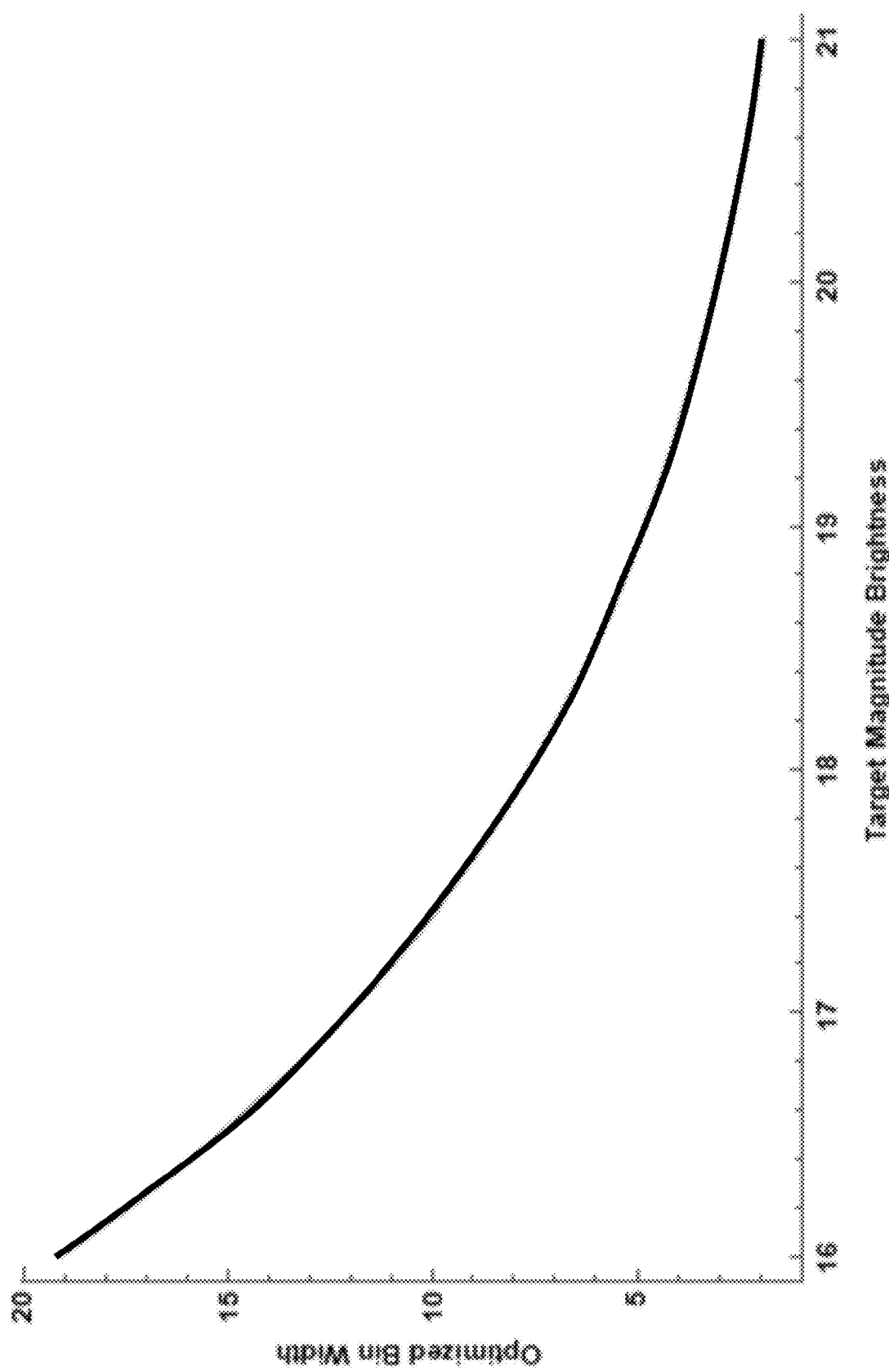
FIG. 11 displays a portion of the data of FIG. 10, redrawn to directly show the selection of an optimal bin size for each stellar magnitude desired to be detected.

FIG. 11 displays a portion of the data of FIG. 10, redrawn to directly show the selection of an optimal bin size for each stellar magnitude desired to be detected. For example, for magnitude 19 targets, an optimal bin size is approximately 6×6=36 pixels.

While exposure time is set before taking imagery, bin size can be dynamically adjusted during the matched filter post-processing steps depending on the speed and brightness of targets of interest that might be present in the observations. Furthermore, if some characteristics are known about the targets of interest a priori, such as motion in a preferred direction, bins need not be symmetrical. Instead of n×n bins, n×m bins may be chosen such that the bins optimally match the most likely paths of targets across the detector.

Example OMFT Method

A beneficial method of Optimized Matched Filter Tracking may proceed as follows:

1) Choose an optimal bin size based on the target's attributes to include its likely speed across the pixel array and its brightness. An analytical model is described below. It relates optimal bin size to brightness and target speed and is known as "an indicative equation."

2) Select a pixel exposure or camera integration time to increase or maximize the time the target will remain in a bin during the exposure.

3) Further reduce computational requirements by processing only for row and column shifts that increase or maximize the available computational capabilities while still capturing the target a desired or necessary number of times to increase the SNR to a detectable level. To identify slow targets, there may be no column or row skipping between shifts. To identify fast targets, many rows or columns may be skipped between each shifted bin image. In each case, the final stack combines many shifted, binned images to reveal the faintest detectable targets along any tested shift direction using significantly fewer bins to reduce the computational load.

Optimizing Bin Width for Maximum SNR

Optical performance in the Optimized Matched Filter Tracking algorithm is quantified using the signal to noise ratio (SNR). SNR is a unit-less quantity that can be estimated using average parameters that characterize the signal and noise sources during data acquisition as a function of instrument specifications and scene qualities. An expression of the SNR is written as a function of the bin width in pixels (n) to explore design trade-offs.

$$SNR = \frac{AFt\eta}{\sqrt{iR^2n^2 + iDn^2t + AFt\eta + ABt\eta\Omega}}$$

| Term | Description | Units |
| --- | --- | --- |
| A | Area of the telescope collection aperture | m² |
| F | Target flux | photons/m²/s |
| t | Exposure time | s |
| η | Combined telescope throughput and quantum efficiency | e-/photons |
| iR | Standard deviation of read noise in the detector associated with electrical current | e-/pixel |
| iD | Variance of dark noise in the detector associated with electrical current | e-²/s/pixel |
| n | Integer bin width in pixels | pixel |
| B | Background illumination flux | photons/m²/arc-sec²/s |
| Ω | Solid angle of background illumination | arc-seconds² |

An example calculation proceeds as follows. Calculate a partial derivative of the SNR with respect to the bin width and set the resulting expression equal to zero. The calculation yields the optimal bin width for maximized SNR as a function of telescope, detector, and scene quantities. The analytical solution for optimal bin width is rounded to the nearest integer. The equation for optimal binning shows which noise terms affect the optimal bin width.

$$n = \sqrt{\frac{AF\eta}{iD + ABIFOV^2 pp^2 \eta}}$$

| Term | Description | Units |
| --- | --- | --- |
| A | Area of the telescope collection aperture | m² |
| F | Target flux | photons/m²/s |
| η | Combined telescope throughput and quantum efficiency | e-/photons |
| iD | Variance of dark noise in the detector associated with electrical current | e-²/s/pixel |
| n | Integer bin width in pixels | pixel |
| B | Background illumination flux | photons/m²/arc-sec²/s |
| IFOV | Instantaneous field of view | arc-seconds/μm |
| pp | Pixel pitch, or the width of an individual pixel | μm/pixel |

Evaluating the SNR as a function of bin width, target magnitude and speed V, and read noise are helpful to understand design sensitivities.

Optimizing Bin Width with Computational Constraints

Bin sizing can be selected to maximize SNR, but may also be adjusted, with additional limitations, to accommodate computing hardware. Compared to using each individual pixel, the number of bins that must be processed during the shift-and-add process is reduced by the square of the bin width. Furthermore, the step size of the velocity hypotheses also increases, further decreasing the computational load by an additional factor of the square of the bin width. For a fixed exposure duration, the maximum velocity that must be hypothesized is determined by the distance, in pixels, that an object traveling across the detector at the maximum angular rate is capable of traversing during the exposure period. Therefore, increasing exposure duration increases the number of velocity hypotheses.

When operating a telescope however, a fixed exposure time is selected before an observation and exposure period can not be dynamically adjusted during post-processing to optimize for specific target objects. (Bin size however, can be dynamically adjusted during the OMFT processing. This will be discussed in a subsequent section.) When computational limits are imposed on the total number of bins that must be processed, the number of velocity hypotheses that can be assessed, and the amount of time available to perform the computations, the best choice of bin size may be limited by computational constraints. The effect is to reduce the limiting magnitude, meaning that computational limits can prevent OMFT from seeing objects that are as dim as objects that can be detected with unlimited computational capabilities. The best choice of bin size that maximizes SNR and limiting magnitude while not exceeding the available computational resources in the required period of time can be selected using this analysis.

Tripwire Spacing to Minimize Processing Steps

Optimized Matched Filter Tracking (OMFT) can include both optimizing the SNR of the images in a stack by selecting the correct exposure time and bin size for a given target speed and magnitude, as well as optimizing the placement of bins on the focal plane. A series of bins can function as a type of "tripwire." The concept of tripwires is used to guide placement of the active bins on the sparsely sampled focal array. Sparsely sampling the focal array is an additional method of reducing the computational load required to detect targets within a desired range of target speed and brightnesses.

Figure 12:
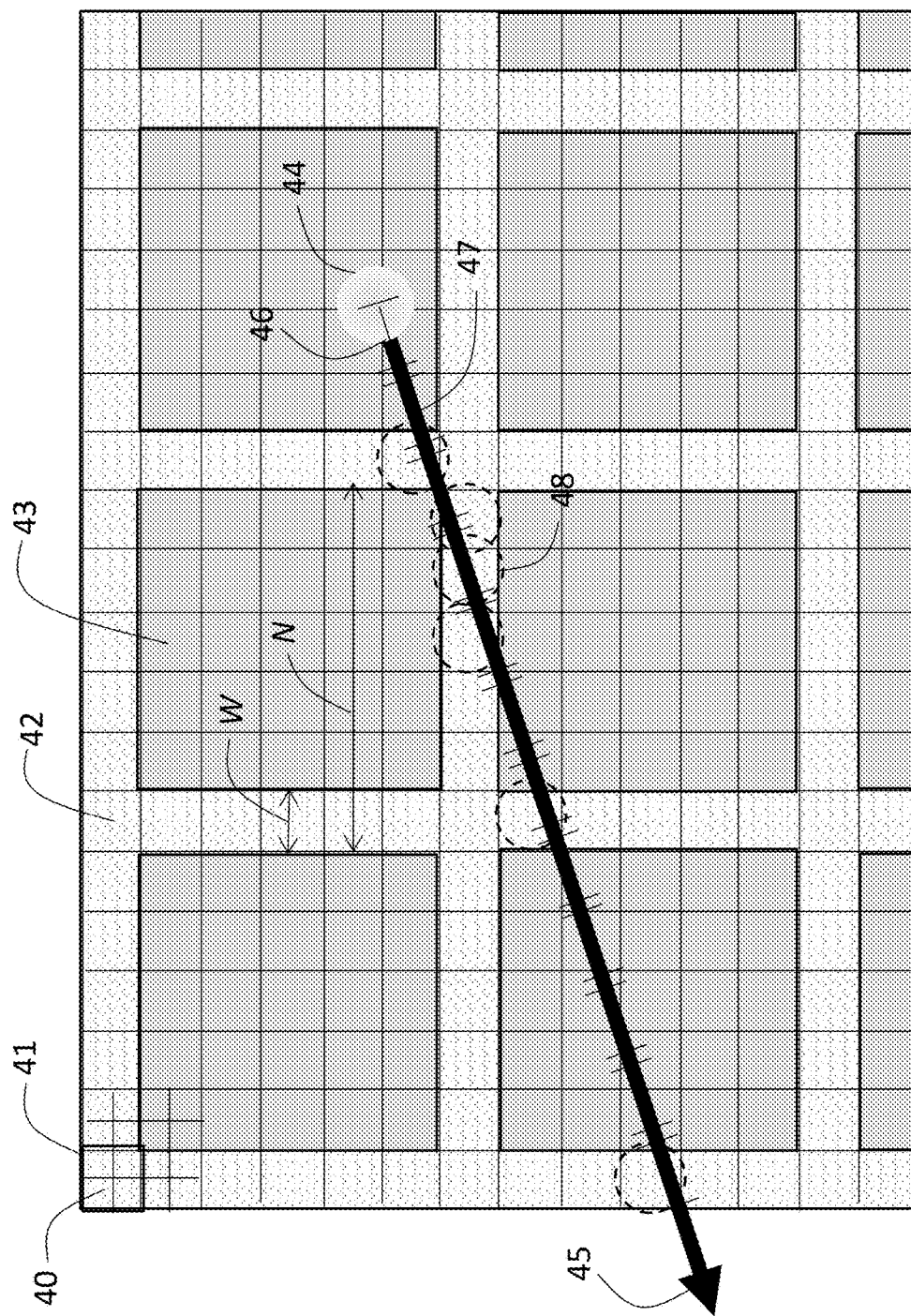
FIG. 12 shows a conceptual layout of tripwires of actively sampled bins across a focal array where the tripwires are arranged in a grid.

FIG. 12 shows a conceptual layout of tripwires of actively sampled bins across a focal array where the tripwires are arranged in a grid. Single pixel 40 is numerically combined with three adjacent pixels to form a 2×2 bin 41. The entire array of 2×2 bins is referred to as a frame. Active bins 42 participate in the shift and stack calculations. Inactive bins 43 do not contribute to the calculation. Active bins are configured in rows and columns to form processing tripwires. Tripwire layout is defined by the width of the tripwire, W, and the spacing between the start of each tripwire, N, both in units of number of bins. For the example shown in the figure, W is equal to 1 bin and N is equal to 6 bins.

As shown in FIG. 12, a moving object may be located at position 44 at the beginning of the exposure period for the first recorded frame. Over time, the object will move across multiple exposed frames along the direction of arrow 45. During the first frame exposure period, the object moves a distance 46. There usually follows some small dead time between exposures. During the second frame exposure, the object moves a distance 47 and so on. In some of the frames, the object will pass through active Tripwire bins during the exposure periods as shown by broken circles 48. Appropriate shift and stacking of many frames can subsequently reveal the passage of an object across the tripwires.

For tracking a dim, moving target that cannot be detected using a single exposure, matched filter tracking requires stacked exposures that sequentially capture the target to allow the signal to rise above the noise. Let the required number of sequential captures to reach the SNR threshold be called $E_{full}$. For a fully populated detector with no spacing between active bins, every exposure will capture the target in some of the active bins. The system only needs to acquire $E_{full}$ exposures to capture the target the required number of times. However, for a detector with spacing between active bins, the number of required exposures to achieve $E_{full}$ successful captures is $E_{full}$ N/W, the required successes divided by the ratio of active bins across a path, which is larger than $E_{full}$ would be for a fully populated detector The increase in processing requirement for additional exposures is offset by the reduction in the number of bins per exposure using the sparsely populated detector, particularly if a lower detection threshold SNR is used initially and subsequently re-processed. The total number of bins on the detector is T, equal to the total number of pixels on the detector divided by the total number of pixels per bin. The number of active bins in any given exposure is: $T(1-(N-W)^2/N^2)$. For a full detector, the total number of bins that have to be processed for the entire stack of the exposures is: $E_{full}T$. For the sparsely populated detector, the total number of bins that must be processed for all the required exposures is: $(E_{full}N/W)[T(1-(N-W)^2/N^2)]$. Therefore, the ratio of bins that must be processed for a detection with the sparse detector versus the full detector is: $(N/W)[1-(N-W)^2/N^2]$, which simplifies to: $2-W/N$. In the case shown in FIG. 12, $W/N=1/6$. Given that W must always be less than or equal to N, this ratio is always greater than or equal to 1. Therefore, it always requires processing more bins per detection when using a sparsely populated detector. The primary advantage is in an increase in the detection rate for a fixed processing power, where the number of bins that can be processed per second is limited.

The exposure time to maximize the SNR of each individual exposure is $t_{best}$. This best single exposure time is not sensitive to the spatial density of active bins. The total observation time to reach a detection for the fully populated detector is then: $t_{best}E_{full}$. The total observation time to reach a detection for the sparse populated detector is $t_{best}E_{full}N/W$ and the ratio of bins that must be processed per unit time for the sparsely populated detector to the fully populated detector is:

$$\frac{(E_{full}N/W)[T(1-(N-W)^2/N^2)]}{t_{best}E_{full}N/W} \Big/ \frac{E_{full}T}{t_{best}E_{full}} = 1 - \frac{(N-W)^2}{N^2}.$$

Since W is always less than or equal to N, this quantity is always less than or equal to 1. Therefore, a sparsely populated detector requires fewer computations per second to achieve detections.

Figure 13:
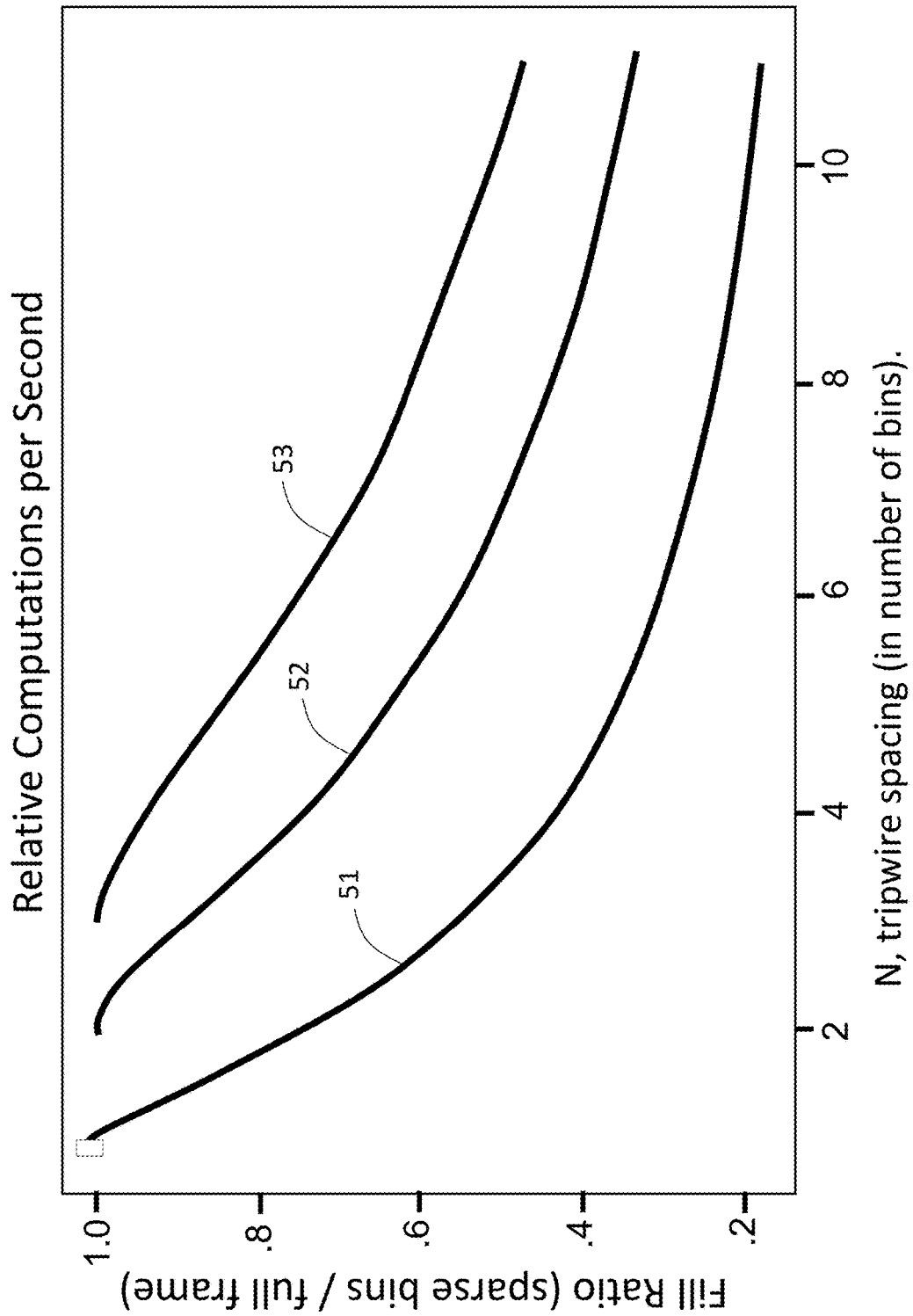
FIG. 13 shows the relative ratio of computations per second required for tripwires of different widths versus varying the tripwire spacing.

FIG. 13 shows the relative ratio of computations per second required for tripwires of width 1-bin shown by curve 51, width 2-bins shown by curve 52, and width 3-bins shown by curve 53, versus varying the tripwire spacing. It illustrates that the number of computations per second to detect a target in the expected range of brightness and rate of motion may be reduced by appropriate selection of tripwire width and spacings.

For an observation period with a fixed duration that is much longer than the amount of time required to detect targets on the sparsely populated detector (longer than: $t_{best}E_{full}N/W$), any single target will be detected under both processing scenarios. OMFT is advantageous in that the total amount of computation will be lower using the sparsely populated detector. If there is a large population of targets to detect, the frames when any single target are in the inactive space between tripwires will still be productive for detection of other targets that are out of phase with the initial target. For a fixed total observation duration that is much longer than the time required to achieve a detection, the sparsely populated detector will detect nearly the same number of total targets as would a fully populated detector while requiring less computational resources.

Dropping Frames or Summing Frames Temporally

Another approach to limiting processing requirements during an observation of fixed duration is to process only a fraction of the individual exposures captured or to sum a subset of frames temporally. Let F be the fraction of individual exposures that are processed. The time required to achieve the threshold SNR increases as F. Similar to the trip wire approach, a lower threshold SNR may be used for the initial detection. Then later, previously dropped or summed frames can be processed to confirm a possible detection using all the captured frames. This method efficiently processes the bins only along the path of the potential target and only hypothesizing positions and velocities within the uncertainty of the possible detection.

As a comparison between the Trip Wire and the Dropping Frames approaches, consider the case where it is desirable to decrease the computations required to process a given amount of observational time by one third. The tripwire method can use widths of 1 bin and spacing of 6 bins, similar to the schematic in FIG. 12. The tripwire approach requires processing $1-(6-1)^2/6^2=30.6\%$ of the bins on 100% of the exposures. The dropping Frames approach simply processes one third of the individual exposures. This second approach would entail processing 100% of the bins on 33% of the exposures, where the exposures are appropriately spaced temporally throughout the multi-image observation period. The trip wire method has the advantage of possibly detecting additional faint targets that remain solely aligned with a tripwire during all the exposures. These targets may otherwise not have been able to be detected if computational limits preclude the processing of all the bins at full resolution. The method of dropping frames has the advantage of detecting slow moving, but bright targets that otherwise would have remained within the space between tripwires throughout the entire observation period. The choice of which method of reducing processing power is used will depend on the range and type of targets being detected.

Temporal Optimized Matched Filter Tracking (OMFT)

Another approach to limiting processing requirements during an observation is to bin one or more pixels temporally (with respect to time) instead of, or in addition to binning spatially. The exposure time may be shorted when binning temporally such that by combining or superimposing an appropriate number of, e.g., sequential, exposures (e.g., grouping them into a temporal bin), this can provide a desired combined exposure length for a given spatial bin.

For certain applications, temporal binning can provide advantages (e.g., in addition to or over spatial OMFT binning). For example, temporal binning can detect a wider range of targets by using combinations of shorter exposure times. Without temporal binning, a single long exposure may be considered best for finding a slower target. However, that may not be optimized to find faster moving objects in the spatial bin. Using temporal binning, the same data can be used for faster targets (using fewer frames) or for slower targets (using more numerous frames). For slower moving targets, a larger number of exposures can be stacked in a bin, while for faster moving targets, a fewer number of exposure can be stacked in a bin (e.g., down to as few as a single exposure).

However, temporal binning may have a trade-off in some situations compared to spatial binning due to read noise. That is, the detector may introduce a substantially fixed amount of noise per exposure. When combining a plurality of exposures into a bin, the read noise may compound. This drawback can be at least partially addressed by using lower noise detectors, such as CMOS detectors.

When adjusting exposure periods for targets at different speeds, temporal binning provides the flexibility of using a series of shorter exposures rather than using a fixed longer exposure. Temporal binning can also be used in combination with spatial binning (e.g., a collection of pixels), to provide the benefits of both binning types.

Column and Row Tripwire Processing

Figure 14:
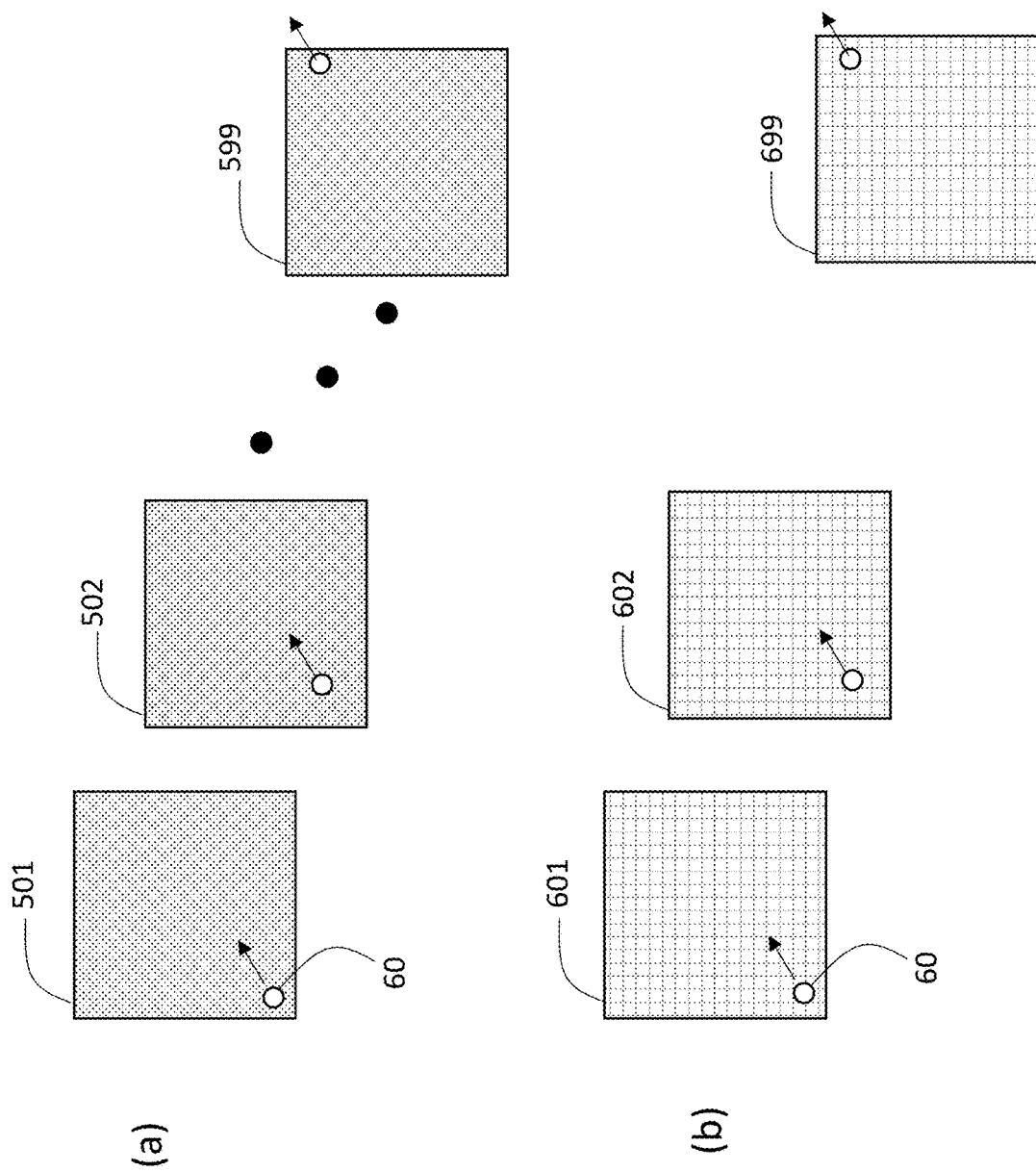
FIG. 14 illustrates the total number of bins which must be processed using less optimized shift and add MFT methods.

FIG. 14 illustrates the total number of bins which must be processed using less optimized shift and add MFT methods. In FIG. 14(a), 100 telescope exposures labeled 501 through 599 are collected using a focal plane array that is 4000 wide by 4000 high pixels. The total pixel count in this array is 16 million pixel elements. One hundred images are sequentially captured during the time that the image of a faint target 60 moves across the array. In FIG. 14(b), the OMFT optimal binning process, 4×4 or 16 adjacent pixels, are combined in a bin. The down-sampled frames labeled 601 through 699 consist of 1000×1000=1 million bins. Calculations can be performed by shifting and adding bins rather than pixels saving a factor of 16× in flop count.

In the example above, results can depend on optics f-number and pixel angular resolution of the imaging system. For example, some systems may not use binning if the angular resolution is already close to the local seeing conditions. On the other hand, systems that are effectively oversampled can use binning to address the oversampling. Accordingly, the approaches herein usually operate on binned data and less often on raw pixel resolution.

Some prior art MFT processing methods can limit the speed search range and thus reduce the total motion hypothesis count. Nevertheless, embodiments described herein can obtain significant advantages due to the optimized binning, the longer exposures, and the tripwire reducing the bin count.

In some embodiments, a balance can be sought between binning (which can tend to suggest longer exposures per frame, or a slower frame rate than normal), and use of tripwires (which can tend to suggest higher frame rates than normal).

Post-Processing to Refine Accuracies

Post-processing can be used to refine astrometric and photometric accuracy along the path of the tracked target. The process described in the previous section allows OMFT to minimize the computational resources required to achieve approximately the same number of detections in a fixed observation time of sufficiently long duration. This process can require additional exposures, many of which may not contribute signal to the shifted stack because the target resided within an unprocessed bin during the exposure. However, the unprocessed bins are still captured and stored in those initially unproductive exposures; they are just not processed in advance. Once a target is detected, its path across the detector can be extracted and the data that was previously not processed can be post-processed. By waiting until the path is known to perform the high fidelity image processing, the reprocessed bins can be limited to solely those that are expected to include the target at that time. Further, the location of the bins can be resampled, as illustrated in FIG. 12 to approximately center the target on each bin when shifted and stacked using OMFT. In some embodiments, to enhance astrometric accuracy, post-processing can be performed on unbinned images at full pixel resolution.

As an example, if the final SNR of 7 is required to confirm a detection, the preliminary detection SNR threshold that can be eventually be raised to 7 after resampling is determined by the tripwire spacing. With a tripwire width of 1 bin and a spacing of 5 bins, a preliminary SNR of 3.1 will be sufficient to achieve an SNR of 7 after resampling the full data. This resample requires processing solely the bins along the path of the target as opposed to every bin. With a tripwire spacing of 10 bins, a preliminary SNR of 2.2 may be sufficient to achieve an SNR of 7 after resampling. Balancing the computations expended upfront to perform the initial detections at a lower resolution will be matched with the appropriate likelihood of false detections to avoid unnecessary reprocessing.

Adjusting Tripwire Design to Match Computational Resources

The processes described above enable the optimization of bin placement on a detector area for a given target speed and brightness to minimize the amount of computational resources necessary to achieve a target SNR. If there are additional computational resources remaining after optimization, multiple passes through the post-processing algorithms can be performed sequentially to optimize detections of objects with other speed and brightness characteristics. Furthermore, these additional types of targets can be targeted in parallel through the superposition of detector masks during processing. Additional tripwires of different sizes can be added to the bins that are planned for processing in each step. Larger or smaller tripwires can be used sequentially or simultaneously for the same exposures to target faster or slower targets. The exposure durations may not be as suited for these objects to maximize the SNR of the individual exposures, but they may still be detected. Furthermore, the binning of the pixels can be adjusted to more closely align the individual exposure times with the new types of objects. While individual exposure times may be fixed in advance of the observations to target a particular type of object, all other parameters such as pixel binning and tripwire spacing can be performed repeatedly as computation power allows and can be superposed to be performed in parallel by increasing the complexity of each processing step.

Track Before Detect and Detect Before Track

By testing many trial motion hypotheses, MFT can aggregate and enhance the signals of faint objects across multiple images, before they have been run through a threshold detector. The method may be characterized as Track-Before-Detect. Similarly, OMFT can also perform Track Before Detect as described previously. The advantage of OMFT over MFT lies in its relatively more efficient use of computation resources that may be limited; as on small spacecraft or other facilities with timeliness, energy consumption, communication bandwidth or hardware limitations. OMFT is desirable for Track Before Detect.

Conversely, a brighter object may be directly detected before it has been subsequently tracked. The method may be characterized as Detect Before Track. After initial detection, the follow-on tracking process will produce a high-resolution estimate of the target direction and speed that is desirable for predicting future locations of the object. Unlike MFT, component concepts of OMFT are also desirable for Detect-Before-Track. The dynamic binning and tripwire methods contained in OMFT result in relatively more efficient use of computational resources for initially detected track parameters and cueing the more highly accurate calculations of MFT in a restricted position and velocity search. OMFT is desirable for Track Before Detect and Detect Before Track applications.

Implementing Computer Option

Figure 15:
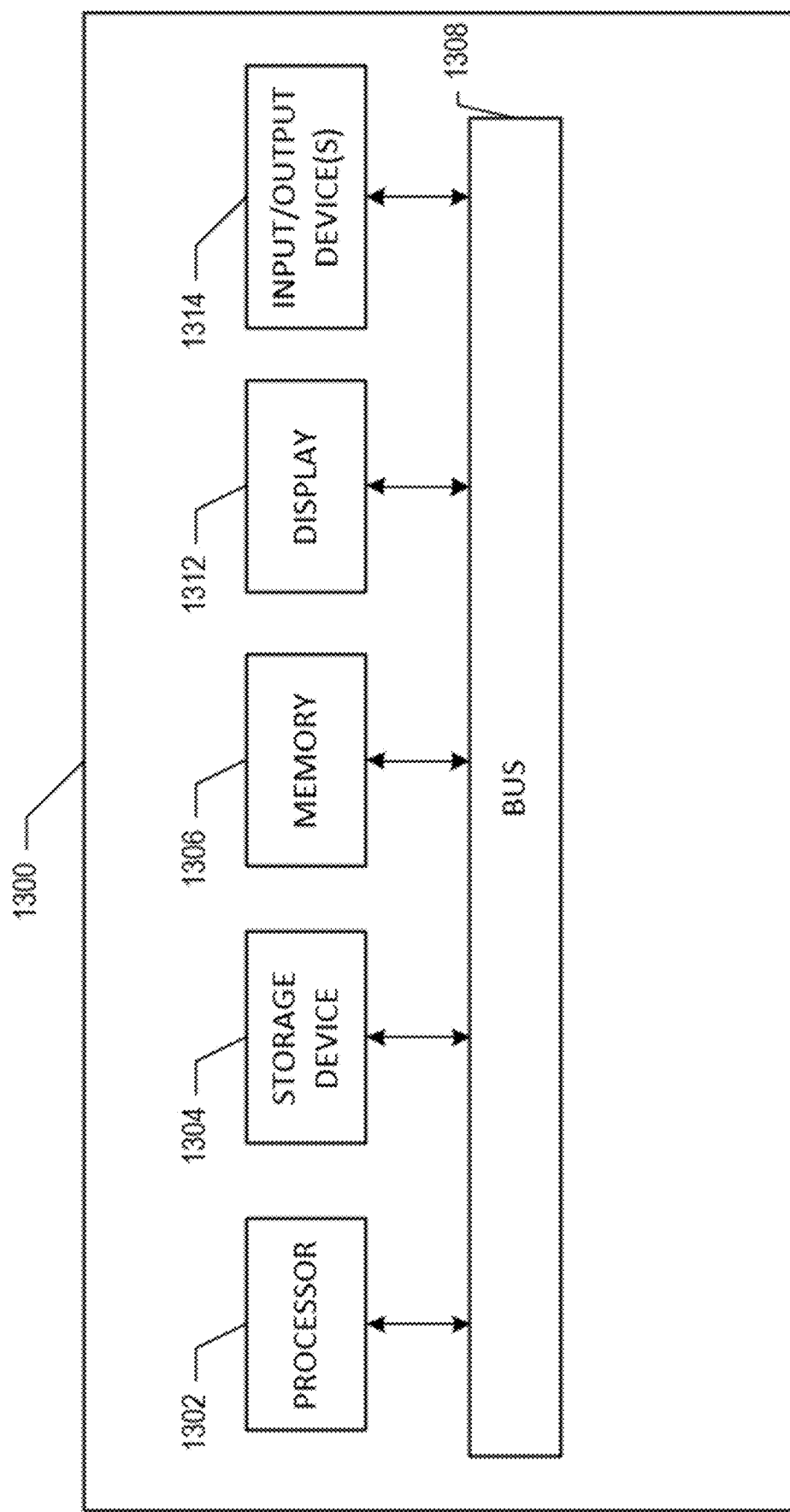
FIG. 15 is a block diagram that illustrates typical components of a computing device.

FIG. 15 is a block diagram that illustrates typical components of a computing device 1300. The computing device

1300 can implement aspects of the present disclosure. The computing device 1300 can communicate with other computing devices.

The computing device 1300 can include a hardware processor 1302, a data storage device 1304, a memory device 1306, a bus 1308, a display 1312, and one or more input/output devices 1314. The hardware processor 1302 may be implemented as a combination of computing devices, e.g., a combination of a digital signal processor and a microprocessor, a plurality of microprocessors, one or more microprocessors in conjunction with a digital signal processor, or any other such configuration. The hardware processor 1302 can be configured, among other things, to execute instructions to perform one or more functions. The data storage device 1304 can include a magnetic disk, optical disk, solid state drive, or flash drive, etc., and is provided and coupled to the bus 1308 for storing information and instructions. The memory device 1306 can include one or more memory devices that store data, such as, without limitation, random access memory (RAM) and read-only memory (ROM). The computing device 1300 may be coupled via the bus 1308 to the display 1312, such as an LCD display or touch screen, for displaying information to a user. The computing device 1300 may be coupled via the bus 1308 to one or more input/output devices 1314. The input device 1314 can include, but is not limited to, a digital camera, keyboard, mouse, digital pen, microphone, or touch screen.

An OMFT application may be stored on the memory device 1306 and executed as a service by the hardware processor 1302. In some embodiments, the OMFT application may implement various aspects of the present disclosure.

Additionally, in some embodiments, one or more processes described herein may be implemented by one or more virtual machines implemented in a hosted computing environment. The hosted computing environment may include one or more rapidly provisioned and/or released computing resources. The computing resources may include hardware computing, networking, and/or storage devices configured with computer executable instructions. A hosted computing environment may also be referred to as a "server-less," "cloud," or distributed computing environment.

It is to be understood that not necessarily all objects or advantages may be achieved in accordance with any particular embodiment described herein. Certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "might," "may," "e.g.," "for example," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Such disjunctive language is not generally intended to, and should not, imply that certain embodiments require at least one of X, at least one of Y, and at least one of Z to each be present. Thus, the term "or" is used in its inclusive sense (and not in its exclusive sense) so that when used, for example, to connect a list of elements, the term "or" means one, some, or all of the elements in the list.

Any process descriptions, elements or blocks in the flow diagrams described herein and/or depicted in the attached figures should be understood as representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The terms "comprising," "including," "having," and the like are synonymous and are used inclusively, in an open-ended fashion, and do not exclude additional elements, features, acts, operations, and so forth.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A system for detecting faint moving objects, the system comprising:
   an optically sensitive array configured to capture image data representing a moving object the image data comprising a plurality of images in which each of the images is obtained using an exposure time;
   a memory configured to store the image data; and
   an image processing system configured to identify the moving object in the image data by:
      establishing a plurality of bins, wherein each bin includes at least a number of pixels sufficient to capture a signal in the image data from the moving object as the signal of the moving object traverses the optically sensitive array during the exposure time;
      establishing at least two tripwires for the optically sensitive array, each tripwire including at least one row or column of bins; and
      for at least one image in the image data, processing the bins in each tripwire without processing the other bins corresponding to other pixels in the image.

2. The system of claim 1, wherein the image processing system is further configured to identify the moving object in the image data by:
   selecting a set of the images for processing by computing an additive stack of selected images containing the tripwire bins,
   wherein processing the bins in each tripwire is performed for the selected set of the images.

3. The system of claim 1, wherein the image processing system is further configured to identify the moving object in the image data by:
   determining an expected direction of travel of the moving object, and
   establishing the bins to be elongated in the expected direction of travel.

4. The system of claim 1, wherein the image processing system is further configured to identify the moving object in the image data by:
   establishing temporal bins such that each of the temporal bins combines a stack of a plurality of exposures for each bin in the set, and
   adjusting the number of exposures in each temporal bin based on an expected speed of the moving object.

5. A method of detecting faint objects, the method comprising:
   receiving a plurality of images from an optically sensitive array;
   identifying one or more objects moving through the images using a plurality of search parameters, wherein the identification is performed using a restricted parameter space;
   adding electrical responses of a number of adjacent photoelectric detecting elements to generate a numerical value of a synthesized data bin of an array of bins, wherein the number of photoelectric detecting elements contributing to the bin and an exposure time for light incident on the photoelectric detecting detectors are determined a priori by analytical calculations designed to enhance the signal-to-noise-ratio for detection of a restricted class of moving objects that are expected to pass through a field of view of the optically sensitive array;
   processing one of the one or more moving objects in a subset of the plurality of images via a computationally sparse sampling resulting in detecting the one or more moving objects above a background noise level of the images; and
   reprocessing the subset of the plurality of images at a higher resolution using limited portions of the subset of the plurality of images that are within a threshold distance of and within a threshold alignment along the directions of the processing of the one or more moving objects.

6. The method of claim 5, wherein processing the one of the one or more moving objects in the subset of the plurality of images via the computationally sparse sampling includes establishing at least two tripwires for the optically sensitive array, each tripwire including at least one row or column of bins.

7. The method of claim 5, further comprising:
   determining a path of each of the one or more moving objects across the optically sensitive array,
   wherein the limited portions of the subset of the plurality of images are within the threshold distance of and within the threshold alignment along the path of each of the one or more moving objects.

8. The method of claim 5, wherein the subset of the plurality of images includes only a fraction of the plurality of images.

9. A system for detecting faint moving objects, the system comprising:
   an optically sensitive array configured to capture image data representing a moving object, the image data comprising a plurality of images in which each of the images is obtained using an exposure time;
   a memory configured to store the image data; and
   an image processing system configured to identify the moving object in the image data by:
      establishing a plurality of bins, wherein each bin includes at least a number of pixels sufficient to capture a signal in the image data from the moving object as the signal of the moving object traverses the optically sensitive array;
      establishing an exposure time for obtaining the plurality of images, wherein the exposure time is established to provide a combined exposure time for a selected one of the bins, and wherein the exposure time is established based on an expected transit time for an expected speed of the moving object traversing the selected one of the bins; and
      detecting the moving object based on the plurality of bins.

10. The system of claim 9, wherein
the image processing system is further configured to identify the moving object in the image data by:
   adjusting the number of exposures in each of the bins based on the expected speed of the moving object, wherein detecting the moving object is further based on the adjusted plurality of bins.

11. The system of claim 9, wherein the image processing system is further configured to identify the moving object in the image data by:
    establishing at least two tripwires for the optically sensitive array, each tripwire including at least one row or column of the plurality of bins; and
    for at least one image in the image data, processing the bins in each tripwire without processing the other bins corresponding to other pixels in the image.

12. The system of claim 11, wherein the image processing system is further configured to identify the moving object in the image data by:
    selecting a set of the images for processing by computing an additive stack of selected images containing the tripwire bins,
    wherein processing the bins in each tripwire is performed for the selected set of the images.

13. The system of claim 9, wherein the image processing system is further configured to identify the moving object in the image data by:
    determining an expected direction of travel of the moving object, and
    establishing the bins to be elongated in the expected direction of travel.

14. The system of claim 9, further comprising:
    a plurality of telescopes are combined into a single platform,
    wherein the plurality of telescopes are configured to be aimed to simultaneously collect the plurality of images including adjacent regions of the sky, and wherein the image processing system is further configured to process the plurality of images singly or collectively in combination to detect and track the moving object.

15. The system of claim 9, wherein the image processing system is further configured to identify the moving object in the image data by:
    dynamically adjusting a binning ratio comprising the number of pixel elements contributing to each bin according to a magnitude of a velocity shift hypothesis.

16. The system of claim 9, wherein the exposure time is established as a multiple of the expected transit time.

17. A system for detecting faint moving objects, the system comprising:
    an optically sensitive array configured to capture image data representing a moving object the image data comprising a plurality of images in which each of the images is obtained using an exposure time;
    a memory configured to store the image data; and
    an image processing system configured to identify the moving object in the image data by:
        establishing a plurality of bins, wherein each bin includes at least a number of pixels sufficient to capture a signal in the image data from the moving object as the signal of the moving object traverses the optically sensitive array;
        detecting the moving object based on the plurality of bins;
        determining a path of the moving object across the optically sensitive array; and
        reprocessing a subset of the plurality of bins along the path of the moving object across the optically sensitive array to improve the detection of the moving object.

18. The system of claim 17, wherein the subset of the plurality of bins includes data that was unprocessed in detecting the moving object and determining the path of the moving object across the optically sensitive array.

19. The system of claim 17, wherein the subset of the plurality of bins are approximately centered on the moving object.

20. The system of claim 17, wherein the image processing system is further configured to identify the moving object in the image data by post-processing the image data at pixel resolution.

* * * * *